(12) United States Patent
Mysyk

(10) Patent No.: US 11,171,865 B2
(45) Date of Patent: *Nov. 9, 2021

(54) SYSTEMS AND METHODS FOR PROVIDING SECURE NETWORK EXCHANGED FOR A MULTITENANT VIRTUAL PRIVATE CLOUD

(71) Applicant: Twilio Inc., San Francisco, CA (US)

(72) Inventor: Andriy Mysyk, San Francisco, CA (US)

(73) Assignee: Twilio Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/845,291

(22) Filed: Apr. 10, 2020

(65) Prior Publication Data

US 2020/0244572 A1    Jul. 30, 2020

Related U.S. Application Data

(63) Continuation of application No. 15/425,934, filed on Feb. 6, 2017, now Pat. No. 10,659,349.

(Continued)

(51) Int. Cl.
*G06F 15/16* (2006.01)
*H04L 12/725* (2013.01)
(Continued)

(52) U.S. Cl.
CPC .......... *H04L 45/3065* (2013.01); *H04L 45/04* (2013.01); *H04L 51/04* (2013.01);
(Continued)

(58) Field of Classification Search
CPC ....... G06F 9/455; H04L 12/00; H04L 65/403; H04L 67/00
See application file for complete search history.

(56) References Cited

U.S. PATENT DOCUMENTS 5,274,700 A    12/1993 Gechter et al.
5,526,416 A     6/1996 Dezonno et al.
(Continued)

FOREIGN PATENT DOCUMENTS

DE    1684587 A1    3/1971
EP    0282126 A2    9/1988
(Continued)

OTHER PUBLICATIONS

"Aepona's API Monetization Platform Wins Best of 4G Awards for Mobile Cloud Enabler", 4G World 2012 Conference & Expo, [Online]. [Accessed Nov. 5, 2015]. Retrieved from the Internet: <URL: https://www.realwire.com/releases/%20Aeponas-API-Monetization>, (Oct. 30, 2012), 4 pgs.
(Continued)

*Primary Examiner* — Brian Whipple
*Assistant Examiner* — Gregory P Tolchinsky
(74) *Attorney, Agent, or Firm* — Schwegman Lundberg & Woessner, P.A.

(57) ABSTRACT

Systems and methods for routing real-time voice communication via a private network exchange. A virtual private cloud (VPC) system receives first configuration for a first private network exchange for a first account of the VPC system. The VPC system assigns a first regional exchange system to the first private network exchange based on the first configuration. The first private network exchange is established between the first regional exchange system and a first outside entity system of the first account by mapping an identifier of the first account to the first private network exchange. Real-time voice communication data for the first account is routed from a first real-time voice communication service of the VPC system to the first outside entity system via the first private network exchange based on the mapping.

19 Claims, 12 Drawing Sheets

Related U.S. Application Data

(60) Provisional application No. 62/291,327, filed on Feb. 4, 2016.

(51) Int. Cl.

| | |
|---|---|
| *H04L 29/06* | (2006.01) |
| *H04L 12/58* | (2006.01) |
| *H04L 29/12* | (2006.01) |
| *H04L 12/715* | (2013.01) |
| *H04L 12/723* | (2013.01) |

(52) U.S. Cl.
CPC ...... *H04L 61/2007* (2013.01); *H04L 61/2514* (2013.01); *H04L 61/2567* (2013.01); *H04L 63/0272* (2013.01); *H04L 45/50* (2013.01)

(56) References Cited

U.S. PATENT DOCUMENTS

| | | | |
|---|---|---|---|
| 5,581,608 | A | 12/1996 | Jreij et al. |
| 5,598,457 | A | 1/1997 | Foladare et al. |
| 5,867,495 | A | 2/1999 | Elliott et al. |
| 5,934,181 | A | 8/1999 | Adamczewski |
| 5,978,465 | A | 11/1999 | Corduroy et al. |
| 6,026,440 | A | 2/2000 | Shrader et al. |
| 6,034,946 | A | 3/2000 | Roginsky et al. |
| 6,094,681 | A | 7/2000 | Shaffer et al. |
| 6,138,143 | A | 10/2000 | Gigliotti et al. |
| 6,185,565 | B1 | 2/2001 | Meubus et al. |
| 6,192,123 | B1 | 2/2001 | Grunsted et al. |
| 6,206,564 | B1 | 3/2001 | Adamczewski |
| 6,223,287 | B1 | 4/2001 | Douglas et al. |
| 6,232,979 | B1 | 5/2001 | Shochet |
| 6,269,336 | B1 | 7/2001 | Ladd et al. |
| 6,317,137 | B1 | 11/2001 | Rosasco |
| 6,363,065 | B1 | 3/2002 | Thornton et al. |
| 6,373,836 | B1 | 4/2002 | Deryugin et al. |
| 6,425,012 | B1 | 7/2002 | Trovato et al. |
| 6,426,995 | B1 | 7/2002 | Kim et al. |
| 6,430,175 | B1 | 8/2002 | Echols et al. |
| 6,434,528 | B1 | 8/2002 | Sanders |
| 6,445,694 | B1 | 9/2002 | Swartz |
| 6,445,776 | B1 | 9/2002 | Shank et al. |
| 6,459,913 | B2 | 10/2002 | Cloutier |
| 6,463,414 | B1 | 10/2002 | Su et al. |
| 6,493,558 | B1 | 12/2002 | Bernhart et al. |
| 6,496,500 | B2 | 12/2002 | Nance et al. |
| 6,501,739 | B1 | 12/2002 | Cohen |
| 6,501,832 | B1 | 12/2002 | Saylor et al. |
| 6,507,875 | B1 | 1/2003 | Mellen-Garnett et al. |
| 6,571,245 | B2 | 5/2003 | Huang et al. |
| 6,574,216 | B1 | 6/2003 | Farris et al. |
| 6,577,721 | B1 | 6/2003 | Vainio et al. |
| 6,600,736 | B1 | 7/2003 | Ball et al. |
| 6,606,596 | B1 | 8/2003 | Zirngibl et al. |
| 6,614,783 | B1 | 9/2003 | Sonesh et al. |
| 6,625,258 | B1 | 9/2003 | Ram et al. |
| 6,625,576 | B2 | 9/2003 | Kochanski et al. |
| 6,636,504 | B1 | 10/2003 | Albers et al. |
| 6,662,231 | B1 | 12/2003 | Drosset et al. |
| 6,704,785 | B1 | 3/2004 | Koo et al. |
| 6,707,889 | B1 | 3/2004 | Saylor et al. |
| 6,711,129 | B1 | 3/2004 | Bauer et al. |
| 6,711,249 | B2 | 3/2004 | Weissman et al. |
| 6,738,738 | B2 | 5/2004 | Henton |
| 6,757,365 | B1 | 6/2004 | Bogard |
| 6,765,997 | B1 | 7/2004 | Zirngibl et al. |
| 6,768,788 | B1 | 7/2004 | Langseth et al. |
| 6,771,955 | B2 | 8/2004 | Imura et al. |
| 6,778,653 | B1 | 8/2004 | Kallas et al. |
| 6,785,266 | B2 | 8/2004 | Swartz |
| 6,788,768 | B1 | 9/2004 | Saylor et al. |
| 6,792,086 | B1 | 9/2004 | Saylor et al. |
| 6,792,093 | B2 | 9/2004 | Barak et al. |
| 6,798,867 | B1 | 9/2004 | Zirngibl et al. |
| 6,807,529 | B2 | 10/2004 | Johnson et al. |
| 6,807,574 | B1 | 10/2004 | Partovi et al. |
| 6,819,667 | B1 | 11/2004 | Brusilovsky et al. |
| 6,820,260 | B1 | 11/2004 | Flockhart et al. |
| 6,829,334 | B1 | 12/2004 | Zirngibl et al. |
| 6,831,966 | B1 | 12/2004 | Tegan et al. |
| 6,834,265 | B2 | 12/2004 | Balasuriya |
| 6,836,537 | B1 | 12/2004 | Zirngibl et al. |
| 6,842,767 | B1 | 1/2005 | Partovi et al. |
| 6,850,603 | B1 | 2/2005 | Eberle et al. |
| 6,870,830 | B1 | 3/2005 | Schuster et al. |
| 6,873,952 | B1 | 3/2005 | Bailey et al. |
| 6,874,084 | B1 | 3/2005 | Dobner et al. |
| 6,885,737 | B1 | 4/2005 | Gao et al. |
| 6,888,929 | B1 | 5/2005 | Saylor et al. |
| 6,895,084 | B1 | 5/2005 | Saylor et al. |
| 6,898,567 | B2 | 5/2005 | Balasuriya |
| 6,912,581 | B2 | 6/2005 | Johnson et al. |
| 6,922,411 | B1 | 7/2005 | Taylor |
| 6,928,469 | B1 | 8/2005 | Duursma et al. |
| 6,931,405 | B2 | 8/2005 | El-shimi et al. |
| 6,937,699 | B1 | 8/2005 | Schuster et al. |
| 6,940,953 | B1 | 9/2005 | Eberle et al. |
| 6,941,268 | B2 | 9/2005 | Porter et al. |
| 6,947,417 | B2 | 9/2005 | Laursen et al. |
| 6,947,988 | B1 | 9/2005 | Saleh et al. |
| 6,961,330 | B1 | 11/2005 | Cattan et al. |
| 6,964,012 | B1 | 11/2005 | Zirngibl et al. |
| 6,970,915 | B1 | 11/2005 | Partovi et al. |
| 6,977,992 | B2 | 12/2005 | Zirngibl et al. |
| 6,981,041 | B2 | 12/2005 | Araujo et al. |
| 6,985,862 | B2 | 1/2006 | Strom et al. |
| 6,999,576 | B2 | 2/2006 | Sacra |
| 7,003,464 | B2 | 2/2006 | Ferrans et al. |
| 7,006,606 | B1 | 2/2006 | Cohen et al. |
| 7,010,586 | B1 | 3/2006 | Allavarpu et al. |
| 7,020,685 | B1 | 3/2006 | Chen et al. |
| 7,039,165 | B1 | 5/2006 | Saylor et al. |
| 7,058,042 | B2 | 6/2006 | Bontempi et al. |
| 7,062,709 | B2 | 6/2006 | Cheung |
| 7,065,637 | B1 | 6/2006 | Nanja |
| 7,076,037 | B1 | 7/2006 | Gonen et al. |
| 7,076,428 | B2 | 7/2006 | Anastasakos et al. |
| 7,089,310 | B1 | 8/2006 | Ellerman et al. |
| 7,103,003 | B2 | 9/2006 | Brueckheimer et al. |
| 7,103,171 | B1 | 9/2006 | Annadata et al. |
| 7,106,844 | B1 | 9/2006 | Holland |
| 7,111,163 | B1 | 9/2006 | Haney |
| 7,136,932 | B1 | 11/2006 | Schneider |
| 7,140,004 | B1 | 11/2006 | Kunins et al. |
| 7,143,039 | B1 | 11/2006 | Stifelman et al. |
| 7,197,331 | B2 | 3/2007 | Anastasakos et al. |
| 7,197,461 | B1 | 3/2007 | Eberle et al. |
| 7,197,462 | B2 | 3/2007 | Takagi et al. |
| 7,197,544 | B2 | 3/2007 | Wang et al. |
| 7,225,232 | B2 | 5/2007 | Elberse |
| 7,227,849 | B1 | 6/2007 | Rasanen |
| 7,245,611 | B2 | 7/2007 | Narasimhan et al. |
| 7,260,208 | B2 | 8/2007 | Cavalcanti |
| 7,266,181 | B1 | 9/2007 | Zirngibl et al. |
| 7,269,557 | B1 | 9/2007 | Bailey et al. |
| 7,272,212 | B2 | 9/2007 | Eberle et al. |
| 7,272,564 | B2 | 9/2007 | Phillips et al. |
| 7,277,851 | B1 | 10/2007 | Henton |
| 7,283,515 | B2 | 10/2007 | Fowler |
| 7,286,521 | B1 | 10/2007 | Jackson et al. |
| 7,287,248 | B1 | 10/2007 | Adeeb |
| 7,289,453 | B2 | 10/2007 | Riedel et al. |
| 7,296,739 | B1 | 11/2007 | Mo et al. |
| 7,298,732 | B2 | 11/2007 | Cho |
| 7,298,834 | B1 | 11/2007 | Homeier et al. |
| 7,308,085 | B2 | 12/2007 | Weissman |
| 7,308,408 | B1 | 12/2007 | Stifelman et al. |
| 7,324,633 | B2 | 1/2008 | Gao et al. |
| 7,324,942 | B1 | 1/2008 | Mahowald et al. |
| 7,328,263 | B1 | 2/2008 | Sadjadi |
| 7,330,463 | B1 | 2/2008 | Bradd et al. |
| 7,330,890 | B1 | 2/2008 | Partovi et al. |
| 7,340,040 | B1 | 3/2008 | Saylor et al. |

(56) References Cited

U.S. PATENT DOCUMENTS

| | | |
|---|---|---|
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,467,227 B1 * | 12/2008 | Nguyen ............ H04L 12/2856 709/238 |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soderstrom et al. |
| 8,103,725 B2 | 1/2012 | Gupta et al. |
| 8,126,128 B1 | 2/2012 | Hicks, III et al. |
| 8,126,129 B1 | 2/2012 | Mcguire |
| 8,130,750 B2 | 3/2012 | Hester |
| 8,139,730 B2 | 3/2012 | Da Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,306,021 B2 | 11/2012 | Lawson et al. |
| 8,315,198 B2 | 11/2012 | Corneille et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,346,630 B1 | 1/2013 | Mckeown |
| 8,355,394 B2 | 1/2013 | Taylor et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,509,068 B2 | 8/2013 | Begall et al. |
| 8,532,686 B2 | 9/2013 | Schmidt et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,806,024 B1 | 8/2014 | Toba Francis et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock et al. |
| 8,861,510 B1 | 10/2014 | Fritz |
| 8,879,547 B2 | 11/2014 | Maes |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,071,677 B2 | 6/2015 | Aggarwal et al. |
| 9,137,127 B2 | 9/2015 | Nowack et al. |

(56) References Cited

U.S. PATENT DOCUMENTS

| | | |
|---|---|---|
| 9,141,682 B1 | 9/2015 | Adoc, Jr. et al. |
| 9,161,296 B2 | 10/2015 | Parsons et al. |
| 9,204,281 B2 | 12/2015 | Ramprasad et al. |
| 9,294,393 B1 * | 3/2016 | Mullooly ................ H04L 41/12 |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Wolthuis et al. |
| 9,378,337 B2 | 6/2016 | Kuhr |
| 9,456,008 B2 | 9/2016 | Lawson et al. |
| 9,456,339 B1 | 9/2016 | Hildner et al. |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 9,774,495 B1 | 9/2017 | Okita et al. |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong et al. |
| 2002/0165957 A1 | 11/2002 | Devoe et al. |
| 2002/0176378 A1 | 11/2002 | Hamilton et al. |
| 2002/0176404 A1 | 11/2002 | Girard |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-nogueiro et al. |
| 2003/0162506 A1 | 8/2003 | Toshimitsu et al. |
| 2003/0195950 A1 | 10/2003 | Huang et al. |
| 2003/0195990 A1 | 10/2003 | Greenblat et al. |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matenda et al. |
| 2005/0015505 A1 | 1/2005 | Kruis et al. |
| 2005/0021626 A1 | 1/2005 | Prajapat et al. |
| 2005/0025303 A1 | 2/2005 | Hostetler, Jr. |
| 2005/0038772 A1 | 2/2005 | Colrain |
| 2005/0043952 A1 | 2/2005 | Sharma et al. |
| 2005/0047579 A1 | 3/2005 | Mansour |
| 2005/0060411 A1 | 3/2005 | Coulombe et al. |
| 2005/0083907 A1 | 4/2005 | Fishler |
| 2005/0091336 A1 | 4/2005 | Dehamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0286496 A1 | 12/2005 | Malhotra et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer, Jr. et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |

(56) References Cited

U.S. PATENT DOCUMENTS

| | | |
|---|---|---|
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0018489 A1 | 1/2009 | Babaev |
| 2009/0037428 A1* | 2/2009 | Achtermann ....... G06F 16/9574 |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0092674 A1 | 4/2009 | Ingram et al. |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0022131 A1 | 9/2009 | Chen et al. |
| 2009/0220057 A1 | 9/2009 | Waters |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0262725 A1 | 10/2009 | Chen et al. |
| 2009/0276771 A1 | 11/2009 | Nickolov et al. |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0029191 A1 | 11/2010 | Sanding et al. |
| 2010/0281108 A1 | 11/2010 | Cohen |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0014981 A1 | 6/2011 | Koren et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Hertel et al. |

(56) References Cited

U.S. PATENT DOCUMENTS

| | | |
|---|---|---|
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0017361 A1 | 7/2012 | Bleau et al. |
| 2012/0170726 A1 | 7/2012 | Schwartz |
| 2012/0174095 A1 | 7/2012 | Natchadalingam et al. |
| 2012/0179646 A1 | 7/2012 | Hinton et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1* | 9/2012 | Bornstein ............... H04L 45/00 709/217 |
| 2012/0254828 A1 | 10/2012 | Aiylam et al. |
| 2012/0266258 A1 | 10/2012 | Tuchman et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0018960 A1* | 1/2013 | Knysz ............... H04L 65/403 709/204 |
| 2013/0029629 A1 | 1/2013 | Lindholm et al. |
| 2013/0031158 A1 | 1/2013 | Salsburg |
| 2013/0031613 A1 | 1/2013 | Shanabrook et al. |
| 2013/0036213 A1* | 2/2013 | Hasan ............... H04L 67/1097 709/223 |
| 2013/0036476 A1 | 2/2013 | Roever et al. |
| 2013/0047232 A1 | 2/2013 | Tuchman et al. |
| 2013/0054517 A1 | 2/2013 | Beechuk et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman |
| 2013/0132545 A1* | 5/2013 | Schultze ............... H04L 41/5045 709/223 |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0188634 A1* | 7/2013 | Magee ............... H04L 12/4633 370/389 |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky et al. |
| 2014/0025503 A1 | 1/2014 | Meyer et al. |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0101149 A1 | 4/2014 | Winters et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm et al. |
| 2014/0037251 A1 | 12/2014 | Fausak et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0146560 A1* | 5/2015 | Johnsson ............... H04L 43/0882 370/252 |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0339136 A1* | 11/2015 | Suryanarayanan ..... G06F 9/455 718/1 |
| 2015/0365480 A1 | 12/2015 | Soto et al. |
| 2015/0370788 A1 | 12/2015 | Bareket et al. |

(56) References Cited

U.S. PATENT DOCUMENTS

| | | |
|---|---|---|
| 2015/0381580 A1 | 12/2015 | Graham, III et al. |
| 2016/0001758 A1 | 1/2016 | Sugio |
| 2016/0011758 A1 | 1/2016 | Dornbush et al. |
| 2016/0012465 A1* | 1/2016 | Sharp ............... G06Q 20/384 705/14.17 |
| 2016/0028695 A1 | 1/2016 | Binder |
| 2016/0065448 A1* | 3/2016 | Loveless ............ H04L 41/0668 370/218 |
| 2016/0077693 A1 | 3/2016 | Meyer et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0234391 A1 | 8/2016 | Wolthuis et al. |
| 2016/0239770 A1 | 8/2016 | Batabyal et al. |
| 2016/0315857 A1* | 10/2016 | Lubashev ........... H04L 12/4633 |
| 2017/0063614 A1* | 3/2017 | Hartwig ............. H04L 41/0886 |
| 2017/0214545 A1* | 7/2017 | Cheng ................. H04L 12/462 |
| 2017/0339283 A1 | 11/2017 | Chaudhary et al. |
| 2018/0026877 A1 | 1/2018 | Mysyk |
| 2019/0274070 A1* | 9/2019 | Hughes .............. H04L 12/4625 |

FOREIGN PATENT DOCUMENTS

| | | |
|---|---|---|
| EP | 1464418 A1 | 10/2004 |
| EP | 1522922 A2 | 4/2005 |
| EP | 1770586 A1 | 4/2007 |
| EP | 2053869 A1 | 4/2009 |
| ES | 2134107 A1 | 9/1999 |
| JP | 10294788 A | 11/1998 |
| JP | 2004166000 A | 6/2004 |
| JP | 2004220118 A | 8/2004 |
| JP | 2006319914 A | 11/2006 |
| WO | WO-9732448 A1 | 9/1997 |
| WO | WO-2002087804 A1 | 11/2002 |
| WO | WO-2006037492 A1 | 4/2006 |
| WO | WO-2009018489 A2 | 2/2009 |
| WO | WO-2009124223 A1 | 10/2009 |
| WO | WO-2010037064 A1 | 4/2010 |
| WO | WO-2010040010 A1 | 4/2010 |
| WO | WO-2010101935 A1 | 9/2010 |
| WO | WO-2011091085 A1 | 7/2011 |

OTHER PUBLICATIONS

"U.S. Appl. No. 15/425,934, Final Office Action dated Sep. 17, 2019", 15 pgs.

"U.S. Appl. No. 15/425,934, Non Final Office Action dated Mar. 19, 2019", 19 pgs.

"U.S. Appl. No. 15/425,934, Notice of Allowance dated Jan. 14, 2020", 14 pgs.

"U.S. Appl. No. 15/425,934, Response filed Nov. 14, 2019 to Final Office Action dated Sep. 17, 2019", 10 pgs.

"U.S. Appl. No. 15/425,934, Response filed Jun. 5, 2019 to Non-Final Office Action dated Mar. 19, 2019", 12 pgs.

"Archive Microsoft Office 365 Email I Retain Unified Archiving", GWAVA, Inc., Montreal, Canada, [Online] Retrieved from the internet: <http://www.gwava.com/Retain/Retain_for_Office_365.php>, (2015), 4 pgs.

"Complaint for Patent Infringement", *Telinit Technologies, LLC* v. *Twilio Inc* 2:12-cv-663, (Oct. 12, 2012), 17 pgs.

"Ethernet to Token ring Bridge", Black Box Corporation, [Online] Retrieved from the internet: <http://blackboxcanada.com/resource/files/productdetails/17044.pdf>, (Oct. 1999), 2 pgs.

"Twilio Cloud Communications—APIs for Voice, VoIP, and Text Messaging", Twilio, [Online] Retrieved from the internet: <http://www.twilio.com/docs/api/rest/call-feedback>, (Jun. 24, 2015), 8 pgs.

Abu-Lebdeh, et al., "A 3GPP Evolved Packet Core-Based Architecture for QoS-Enabled Mobile Video Surveillance Applications", 2012 Third International Conference on the Network of the Future {NOF), (Nov. 21-23, 2012), 1-6.

Barakovic, Sabina, et al., "Survey and Challenges of QoE Management Issues in Wireless Networks", Hindawi Publishing Corporation, (2012), 1-29.

Berners-Lee, T., "RFC 3986: Uniform Resource Identifier (URI): Generic Syntax", The Internet Society, [Online], Retrieved from the Internet: <URL: http://tools.ietf.org/html/rfc3986>, (Jan. 2005), 57 pgs.

Kim, Hwa-Jong, et al., "In-Service Feedback QoE Framework", 2010 Third International Conference on Communication Theory. Reliability and Quality of Service, (2010), 135-138.

Matos, et al., "Quality of Experience-based Routing in Multi-Service Wireless Mesh Networks", Realizing Advanced Video Optimized Wireless Networks. IEEE, (2012), 7060-7065.

Mu, Mu, et al., "Quality Evaluation in Peer-to-Peer IPTV Services", Data Traffic and Monitoring Analysis, LNCS 7754, 302-319, (2013), 18 pgs.

Subramanya, et al., "Digital Signatures", IEEE Potentials, (Mar./Apr. 2006), 5-8.

Tran, et al., "User to User adaptive routing based on QoE", ICNS 2011: The Seventh International Conference on Networking and Services, (2011), 170-177.

\* cited by examiner

NEW PORT

Location: San Jose ▽

Bandwidth: ● 1Gbps  ○ 10Gbps

Exchange Type: ▽
VPN
Cross Connect
MPLS Verizon

[ Cancel ] [ Create ]

FIGURE 2

SYSTEMS AND METHODS FOR PROVIDING SECURE NETWORK EXCHANGED FOR A MULTITENANT VIRTUAL PRIVATE CLOUD

CLAIM OF PRIORITY

This application is a Continuation application under 35 USC § 120 of U.S. patent application Ser. No. 15/425,934, entitled "Systems and Methods for Providing Secure Network Exchanged for a Multitenant Virtual Private Cloud," filed on Feb. 6, 2017, which claims the benefit of U.S. Provisional Application No. 62/291,327, filed on Feb. 4, 2016, all of which are incorporated herein by reference.

TECHNICAL FIELD

This disclosure relates generally to the communication networking field, and more specifically to new and useful systems and methods for providing secure network exchange for a multitenant virtual private cloud in the communication networking field.

BACKGROUND

Many companies, products, and services use cloud-hosted computing resources during operation. Often times the cloud hosted computing resources are accessed over a public internet connection. However, use cases have legal or business restrictions or objectives that make a public internet connection not viable. In one case, the security of a connection to the cloud-hosted computing resource is not secure when established over the public internet. For example, a voice call from a customer support system may not be permitted to use public internet connections since social security or credit card numbers may be exchanged during a voice call. In another case, the quality of the connection may not be satisfactory. The bandwidth restrictions and/or the uptime of a connection through the public internet connection may not provide the level of service desired by a company. While, cloud-hosted computing resources can use network exchange solutions. There are no solutions that enable a multi-tenant platform as a service product to provide such network exchange solutions. Thus, there is a need in the communication field to create a new and useful system and method for providing a secure network exchange for a multitenant virtual cloud. These embodiments disclosed herein provide such a new and useful system and method.

BRIEF DESCRIPTION OF THE DRAWINGS

FIG. 2 is a schematic representation of an exemplary configuration interface;

DETAILED DESCRIPTION

The following description of preferred embodiments is not intended to limit the invention to these preferred embodiments, but rather to enable any person skilled in the art to make and use this invention.

1. System

Figure 1:
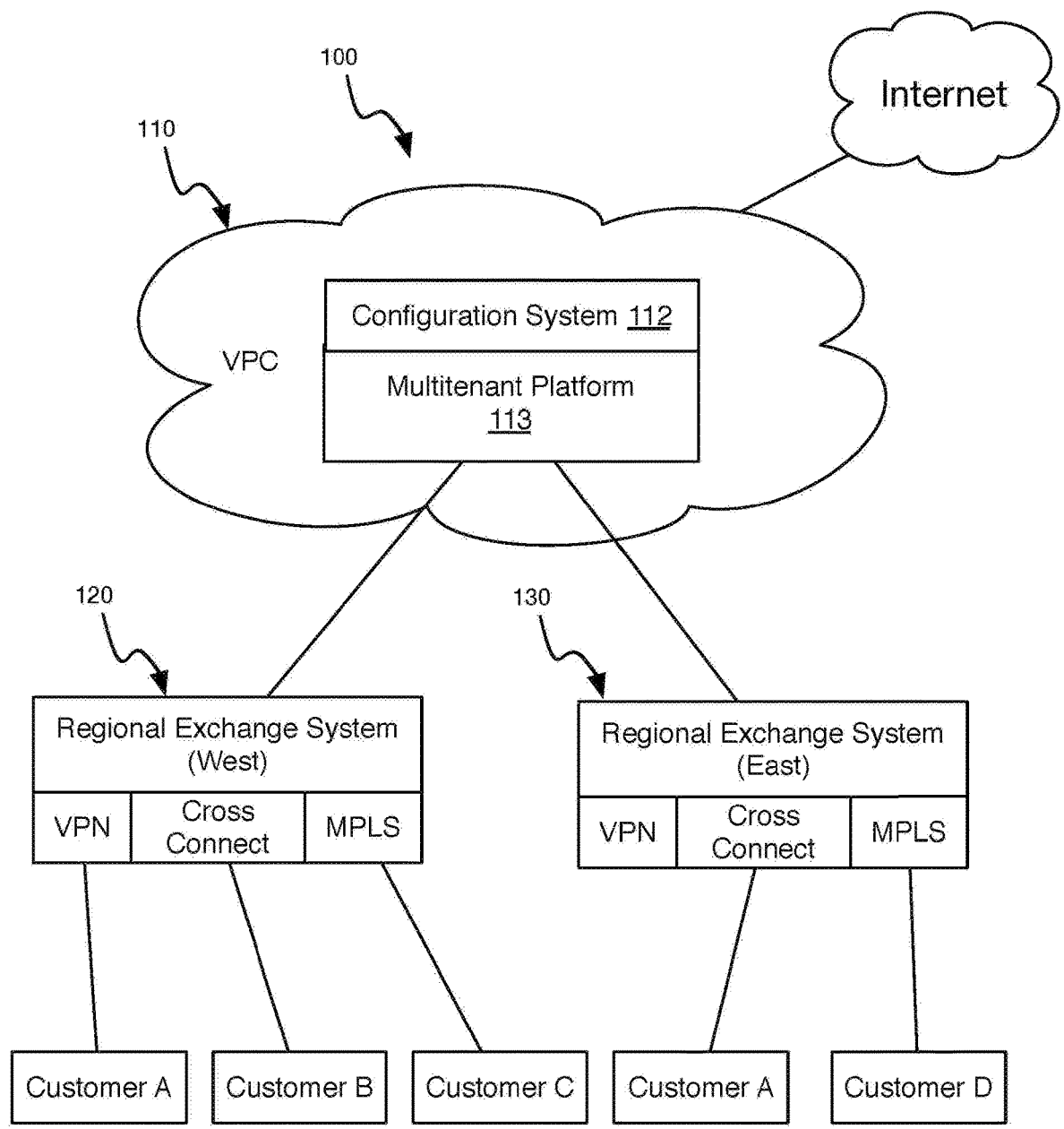
FIG. 1 is a schematic representation of a system of a preferred embodiment.

As shown in FIG. 1, a system (e.g., 100) for providing a secure network exchange for a multitenant virtual cloud of a preferred embodiment can include a set of regional exchange systems (e.g., 120, 130) that include a set of secure connection interfaces (e.g., VPN, Cross Connect, MPLS), a multitenant platform (e.g., 113) in a virtual private cloud (e.g., 110), and a configuration system (e.g., 112). The system can additionally include a virtualized IP (internet protocol) system. The system functions to enable a multitenant platform (e.g., 113) to offer network exchange functionality to a variety of entities (e.g., Customer A, Customer B, Customer C) using the multitenant platform (e.g., 113). The system is particularly applicable to a multitenant platform as a service product that is hosted in an infrastructure as a service cloud computing product such as Amazon Web Services or other suitable hosting solutions. Current exchange solutions do not address the challenge of offering network exchange capabilities to multiple entities for a platform built in a virtual private cloud (VPC) (e.g., 110). The system can be used by entities (e.g., Customer A, Customer B, Customer C) that require or desire to have a more secure or reliable data link to the multi-tenant platform (e.g., 113). For example, a company building a phone or messaging system that deals with sensitive information such as social security numbers, credit card numbers, bank account numbers, medical health records, and other sensitive information may require a network connection that is secured, where access over public internet routing is not acceptable. In another example, a company building a product that has high performance requirements relating to media quality, bandwidth, uptime, or other communication properties may find basic public internet access to be infeasible.

A set of regional exchange systems (e.g., 120, 130) functions to provide physical collocated networking infrastructure to facilitate establishing secure connections. The set of regional exchange systems (e.g., 120, 130) are preferably regionally distributed in distinct geographic locations. There may be multiple regional exchange systems in the United States and in other regions of the world. There can be any suitable geographic distance between any two regional exchange systems (e.g., 120, 130). One exemplary implementation may have over one hundred or even a thousand miles between different regional exchange systems. For example, the United States may have at least one regional exchange system based in the Western side and a second based in the Eastern side. The regional exchange systems are preferably established in collocated infrastructure environments where direct secured connections can be established to other computing resources accessible at the collocated site. Preferably, an edge computing resource is also established at the collocated site and the outside entity wanting to establish a secure connection can have a physical computing resource presence at the same collocated site. A secured connection can be made between at least one edge computing resource of the multitenant platform (e.g., 113) and a computing resource of the outside entities (e.g., Customer A, Customer B, Customer C).

Preferably, the regional exchange systems include a set of secure connection interface options that include a VPN connection, a cross connect connection, and an MPLS (Multiprotocol Label Switching) connection. The system can provide one or multiple secure connection interface options, which may include the above variations and/or any suitable alternative type of secure connection interface options. The types of secure connection interface options can be uniform in each regional exchange system but may alternatively be different for at least two subsets of regions.

A VPN (Virtual Private Network) connection interface functions to provide a straightforward and possibly faster setup time for a secure connection. The VPN can make the connection over a secured tunnel. The VPN connection interface can provide strong authentication and encrypted (e.g., IPSec) communication across the internet. The VPN can enable a secure connection while still using connectivity via the internet. The VPN connection interface can be used by an outside entity in combination with a physical or virtual router that supports IPSec VPN or other suitable internet security protocol.

A cross connect interface functions to establish a communication connection over a dedicated physical link that could be additionally encrypted. The cross connect interface can utilize a piece of circuit-switched network equipment. The cross connect interface provides a physical link to the multitenant platform, wherein the physical link is dedicated to the traffic of the outside entity. The physical link can be a fiber link, an optical link, or any suitable type of connection link. The cross connect interface can include quality of service controls. The outside entity preferably uses an established gateway presence in at least one of the collocation sites to establish a connection to the regional network exchange system through a cross connect interface. The gateway resources of the outside entity are preferably peered with the cross connect interface of the regional exchange system.

A MPLS connection interface functions to establish a connection via a private carrier network. The MPLS connection interface can be encrypted. The MPLS connection interface puts traffic of the outside entity on a separate virtual network inside a physical private network. The MPLS connection interface can provide quality of service management as part of the MPLS-based private cloud offering used by the outside entity. The MPLS connection interface offers a data-carrying service that directs data from one network node to another based on short path labels, which may avoid complex lookups in a routing table. Various access technologies may be used.

In one embodiment, the set of exchange system includes a set of customer entities leveraging a customer exchange subsystem and a set of service providers used by the multitenant platform using a service exchange subsystem. In a telecommunication platform variation, user entities such as customer care systems, business phone solutions, VoIP products, messaging services may establish secure network connections through a customer exchange subsystem, and voice and messaging carriers may establish secure network connections through a service exchange subsystem.

The multitenant platform (e.g., 113) functions to provide an operational service that involves network connections to a plurality of entities. A multitenant platform can enable multiple accounts to use the platform in facilitating various operations performed by the multitenant platform tasks. Additionally, each account within the multitenant platform may itself have a subaccount. Accordingly, an account may support multiple use-case scenarios for different sub-account holders wherein communication, data/analytics, billing, and/or other aspects can be scoped to an account, a sub-account, or any suitable scope. The multitenant platform preferably is hosted in a virtual private cloud (VPC) (e.g., 110). In other words, the multitenant platform can be built on top of third-party cloud computing resources (e.g., IaaS solutions such as AWS). The multitenant platform (e.g., 113) can be a server, a server cluster, a collection of components on a distributed computing system, or any suitable network accessible computing infrastructure. The multitenant platform (e.g., 113) can be implemented in part through a service-directed architecture wherein different operational responsibilities of the platform can be subdivided between different internal services. Those services can be composed of multiple servers or machine nodes, which can preferably be scaled out horizontally and workload balanced across the set of nodes.

The multitenant platform (e.g., 113) can provide any suitable computing service. In one preferred implementation, the multitenant platform is a communication platform. The communication platform can be designed for one or more mediums of communication. The communication platform may support various forms of communication in addition to the mediums described herein. A communication platform can provide voice communication connectivity (e.g., PSTN, SIP, etc.), messaging (SMS, MMS, IP messaging, etc.), communication business logic, conferencing, broadcasting, data streaming, and/or any suitable communication operations. The communication functions to provide communication services to developer applications and services. Various outside entities can build service and products that can leverage the functionality of the communication platform to perform one or multiple communication tasks. The system is preferably implemented in combination with a communication platform such as the one described in patent application Ser. No. 12/417,630 filed 2 Apr. 2009, entitled "System and Method for Processing Telephony Sessions", which is hereby incorporated in its entirety by this reference. The communication platform preferably enables application execution in connection to communication sessions and/or messages; the communication platform may additionally or alternatively provide an application programming interface (API) as an alternative for interacting with communication functionality of the communication platform. Herein the multitenant platform is primarily described as being applied to the telecommunication networking space, but the platform may provide any suitable type of computing service such as financial transactions, data warehousing/processing, and/or any suitable computing service.

The multitenant platform of the system is preferably hosted in a virtual private cloud (VPC) (e.g., 110). A VPC can be an on-demand configurable pool of shared computing resources from an IaaS cloud environment. The VPC is preferably a set of resources provisioned from a third-party cloud solution provider to the operator of the multitenant platform. The cloud environment generally does not provide network exchange solutions to address the needs of a multitenant platform operating within their cloud. The system in part addresses the challenges of providing a networking solution when the physical resources are provisioned by another party.

In one implementation, the computing resources within the multitenant platform are preferably operated within two subnets an edge subnet and a private subnet. A subnet is generally a block of contiguous IP addresses. Services and products can be designed so that they configure edge servers within the edge subnet and internal resources operate within the private subnet. The edge subnet includes a set of edge nodes. The edge nodes can be different services or products offered by the multitenant platform. For example, in a telecommunications platform there may be a SIP edge server, a messaging edge server, a video streaming edge server, an IP Client communication edge server, and/or any suitable type of service edge server. The edge nodes are the computing resources exposed to the outside entities connecting through the exchange system. These edge servers are preferably configured for the various services or products to talk to computing resources within the private subnet. The private subnet includes a variety of services that preferably provide the core service functionality.

A routing manager can be used to govern how the hosts in the edge subnet can reach outside entities through the network exchange system. The routing manager can include a network address translation layer. For example, each outside entity can be given particular IP addresses. The routing manager can transparently figure out to which gateway the traffic could be forwarded. The routing manager can additionally address challenges of routing based on geographic region. Traffic may be routed to one of a set of regional exchange systems depending on various factors.

The routing manager or an alternative system can enable virtualized IP settings to provide a level of abstraction between the IP address used by an outside entity and the actual IP of the computing resources.

The system can additionally include a configuration system (e.g., 112), which functions to enable provisioning, deprovisioning, and modifying of network exchange settings for an outside entity. An outside entity that wants to begin using a network exchange can enable such a feature through one of a variety of different interfaces.

One possible configuration interface can include a programmatic interface. More specifically, the programmatic interface is an application programming interface (API). The configuration interface is preferably a RESTful API but may alternatively be any suitable API such as SOAP or custom protocol. The RESTful API works according to an application layer request and response model. An application layer request and response model may use an HTTP-based protocol (HTTP or HTTPS), SPDY, or any suitable application layer protocol. Herein, HTTP may be used, but should not be interpreted as being limited to the HTTP protocol. HTTP requests (or any suitable request communication) to the communication platform preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service can include account exchange setting resources, which act resources that can in part define network exchange operation.

The configuration system can be a control portal user interface accessible through a website, an application, or other graphical user interface. An administrator of an account can preferably navigate to the control panel and select an option for adding and configuring one or more network exchanges used by the account as shown in FIG. 2.

The system can additionally include a metering and billing system. The metering subsystem of the preferred embodiment functions to monitor and log activity by an account through a network exchange. The metering and logging system operates in coordination with the system. The metering subsystem can track data activity including throughput, types of service traffic, and other properties of network exchange usage. The metering subsystem can be used in providing programmatic hooks (e.g., callback URI triggering, application execution, and the like), billing/crediting an associated entity (e.g., charging for services or controlling resource access), creation of an audit trail, and/or other suitable functionality.

A billing engine may operate independently of the metering subsystem, but may alternatively be integrated. A billing engine preferably calculates amount owed by a particular account/sub-account. The billing engine can additionally facilitate collecting and distributing of funds as appropriate. Such accounting may be used in billing or crediting an entity/account for metered usage, which functions to allow a sustainable media intelligence platform to be operated. In another variation, usage accountability can be used in limiting and balancing usage of a particular entity. As the platform is preferably multitenant, usage is preferably balanced across multiple entities. Rate limiting and action limits may be imposed at various times. Additionally, as use of a communication infrastructure is often accompanied with significant financial cost, fraudulent behavior by accounts or users of an account can be harmful to users of the platform and to the platform itself. Fraud detection can additionally be accounted for during usage of the platform.

Figure 3:
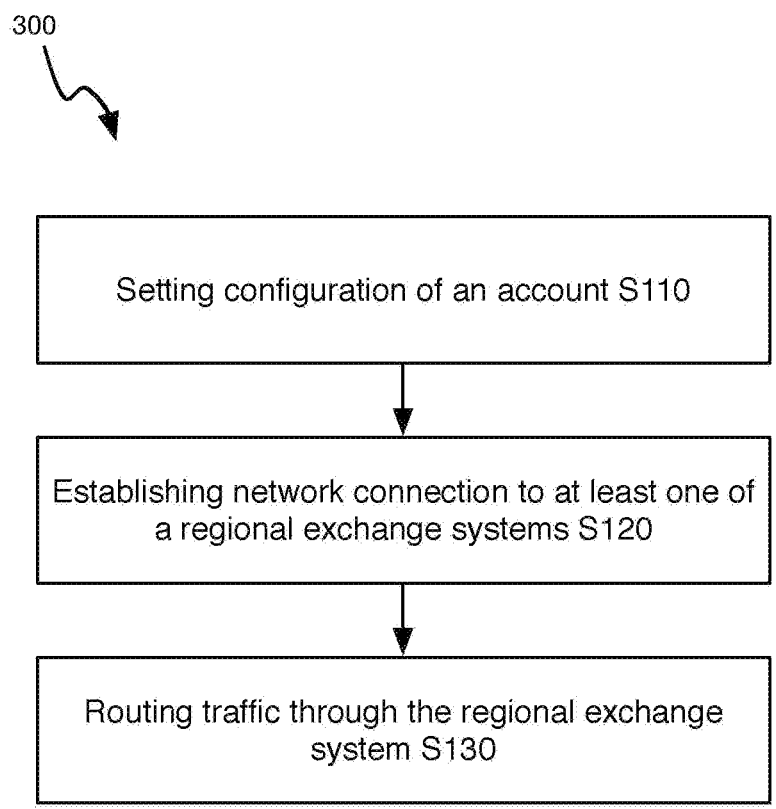
FIG. 3 is a flow diagram representation of a method of a preferred embodiment.

As shown in FIG. 3, a method for configuring network exchange for a multitenant platform in a virtual private cloud can include setting configuration of an account S110, establishing network connection to at least one of a regional exchange systems S120, and routing traffic through the regional exchange system S130.

The method functions to enable a multitenant platform (e.g., 113) to offer network exchange functionality to a variety of entities using the multitenant platform. The method is particularly applicable to a multitenant platform as a service product that is hosted in an infrastructure as a service (IaaS) cloud computing product such as Amazon Web Services or other suitable hosting solutions. Current exchange solutions do not address the challenge of offering network exchange capabilities to multiple entities for a platform built in a virtual private cloud (VPC). The method can be used by entities that require or desire to have a more secure or reliable data link to the multi-tenant platform.

The processes of the method are preferably implemented by multiple entities. In one implementation, the method may be used repeatedly so that multiple end users of the multitenant platform establish independently managed network exchange integrations. For example, the method may be implemented in association with various customers of a telecommunication platform to establish voice or messaging communication through independent, secured network connections for each customer. In another implementation, the method may be used repeatedly so that multiple service providers of the multitenant platform. For example, the method may be implemented with various carrier networks used by a telecommunication platform. The carrier networks may not be end customers but rather resources used in facilitating performing operations on the multitenant platform. In a telecommunication platform, customers and service providers can preferably both use the network exchange.

The method is preferably implemented by a system substantially similar to the one described above (e.g., 100), but any suitable system may be used.

Block S110, which includes setting configuration of an account, functions to define settings for a network exchange of an account. The multitenant platform (e.g., 113) can have a plurality of different accounts. As described above, these accounts may be end user accounts, internal accounts (e.g., used for various outside vendors or service providers), and/or any suitable outside entity. The set of accounts can include a subset of accounts that use the network exchange functionality, but a second subset of accounts may not use the network exchange functionality. An account without a configured network exchange can provision or add a new network exchange option. Setting configuration of a new network exchange can include selecting the type of network exchange, setting account system settings, setting a region, and enrolling the account for the selected type of network exchange. As described above, a variety of network exchange interfaces may be used. The set of possible network exchange interfaces can include a VPN connection, a cross connect connection, and an MPLS connection. Additionally, multiple different network exchange instances can be provisioned. Multiple network exchange instances for one account may provide regional performance enhancements, redundancies, and/or other benefits.

Setting configuration of a VPN can involve receiving or setting authentication credentials (e.g., username and password) and determining the IP address to be used. Cross connect may involve initializing a workflow for signing of a legal document to authorize use of the cross connect. Once confirmed, automated integration instructions can be issued. The integration issues may specify a port number and location to be used in a collocated environment to establish the cross connect integration. In one variation, a wire can be physically plugged in at the appropriate port in the regional exchange system. In another variation, the wires are prepopulated and a routing service configures the router to establish a cross connection between appropriate ports. MPLS may involve establishing a three-way agreement between appropriate entities if the outside entity is in the network. If the entity establishing the network exchange integration is not in the network, then a workflow can be initiated to onboard the entity into the network.

Setting configuration of an account may additionally include updating at least one previously provisioned network exchange instance. An authorized account could update the settings in any suitable manner.

Setting configuration of an account may additionally include deprovisioning a network exchange instance, which functions to deactivate, end, or suspend an accounts usage of a private and secured network integration.

Setting configuration can be performed through a programmatic interface or a user interface.

Block S120, which includes establishing network connection to at least one of a regional exchange systems (e.g., 120, 130), functions to connect the outside computing resources of the account holder (e.g., outside computing resources of Customer A, Customer B, Customer C) to those of the multitenant platform (e.g., 113). The network connection can be established over VPN, a cross connect connection, or an MPLS connection.

Block S130, which includes routing traffic through the regional exchange system, functions to receive and transmit data through the established regional exchange network. Routing traffic can include IP translation, which functions to translate between the public IP address used by a customer and the actual resource IP addressed of the hosts. Routing traffic can additionally include routing between the edge subnet and the private subnet. As mentioned, multiple entities may have a network exchange connection. In some cases, a communication may be established through two or more network exchanges. For example, a phone call may be established from a customer's network exchange and that communication may have at least one leg connected to a carrier through a network exchange of the carrier.

Additionally, the method can include monitoring and responding to usage of the network connection. The usage, amount of traffic, types of services used and/or other activities may be tracked based on individual accounts. The accounts are preferably billed or credited for individual usage.

Systems

Figure 4A:
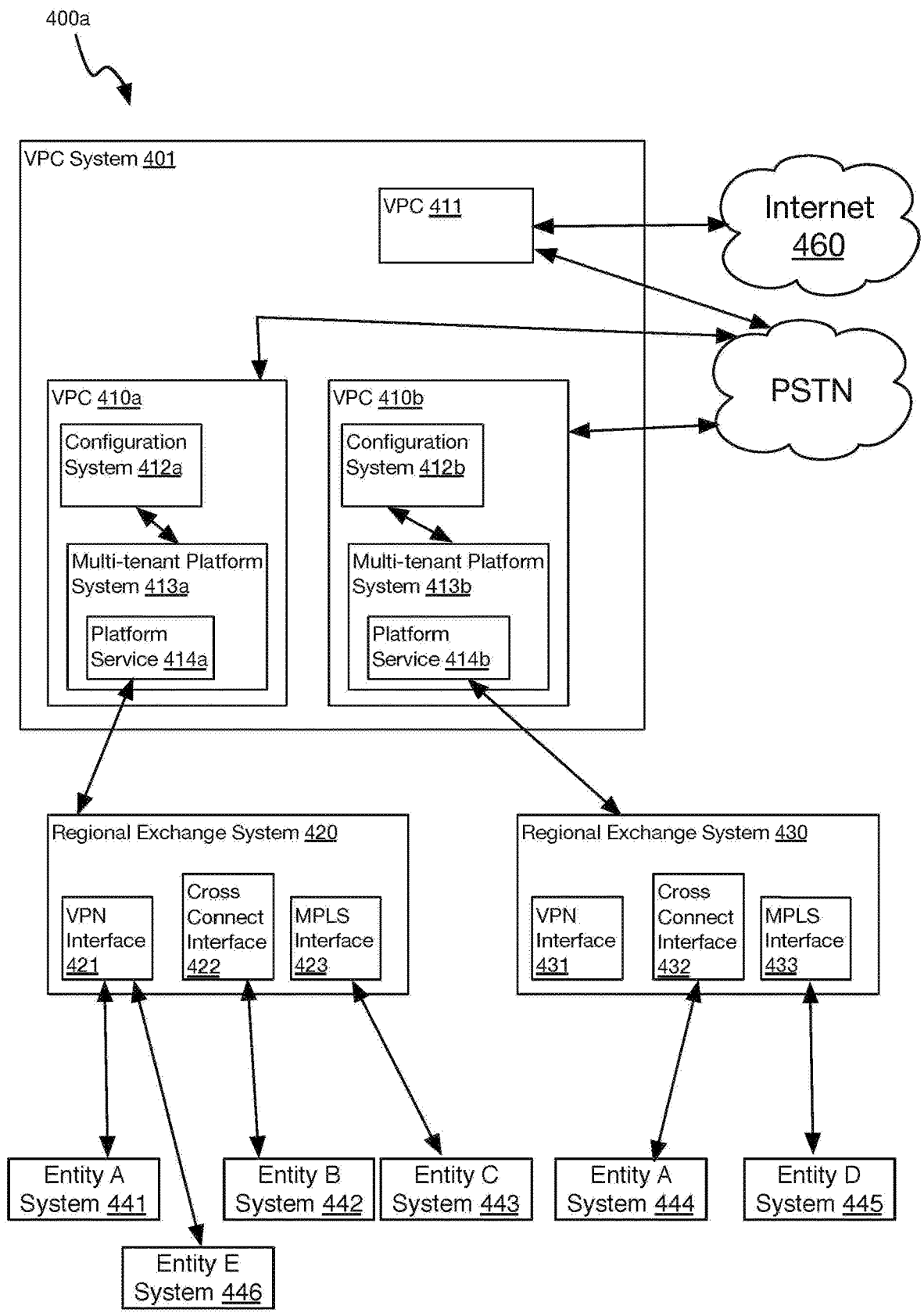
FIGS. 4A-4C are schematic representations of a systems of preferred embodiments.
Figure 4B:
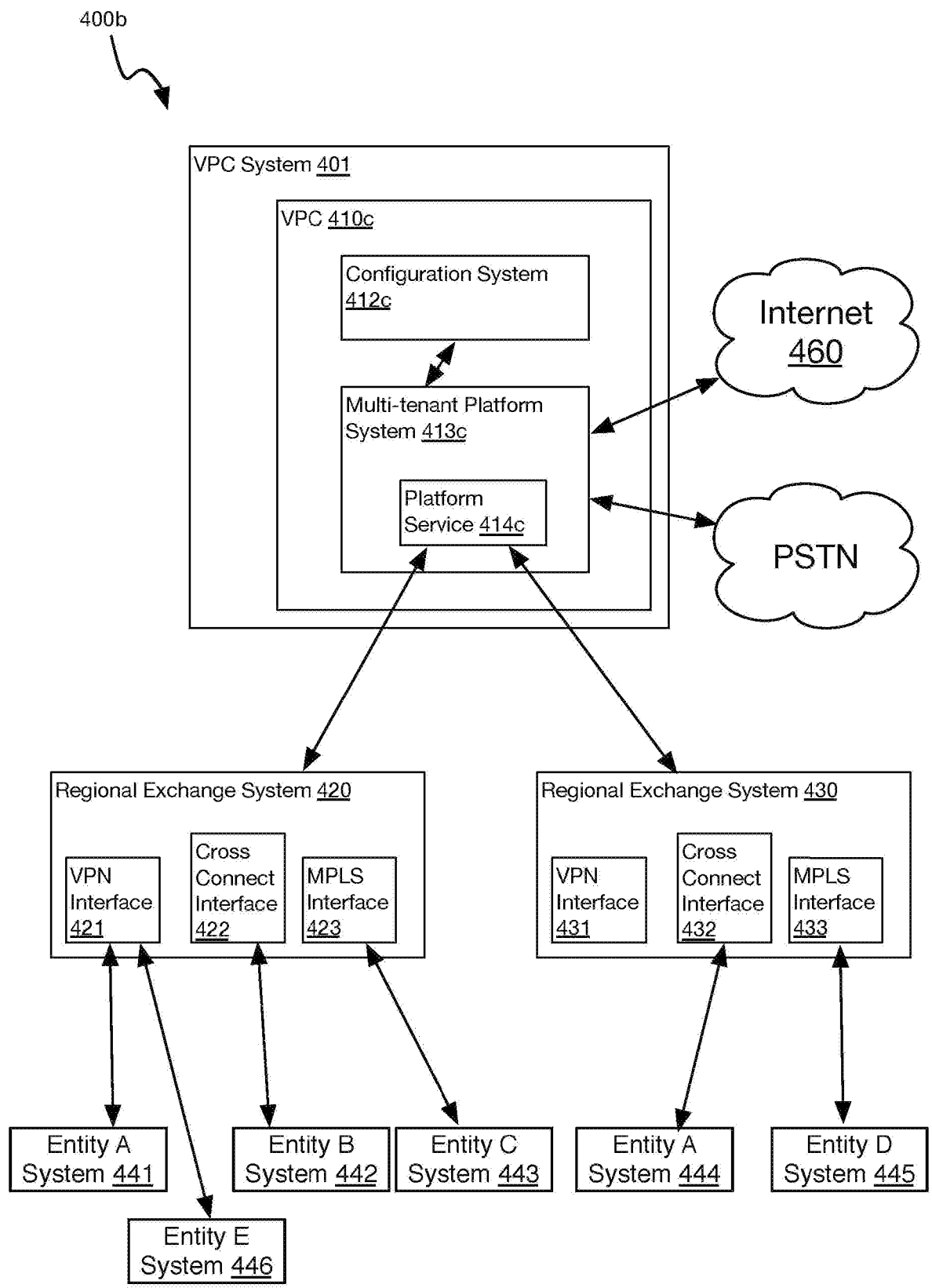
Figure 4C:
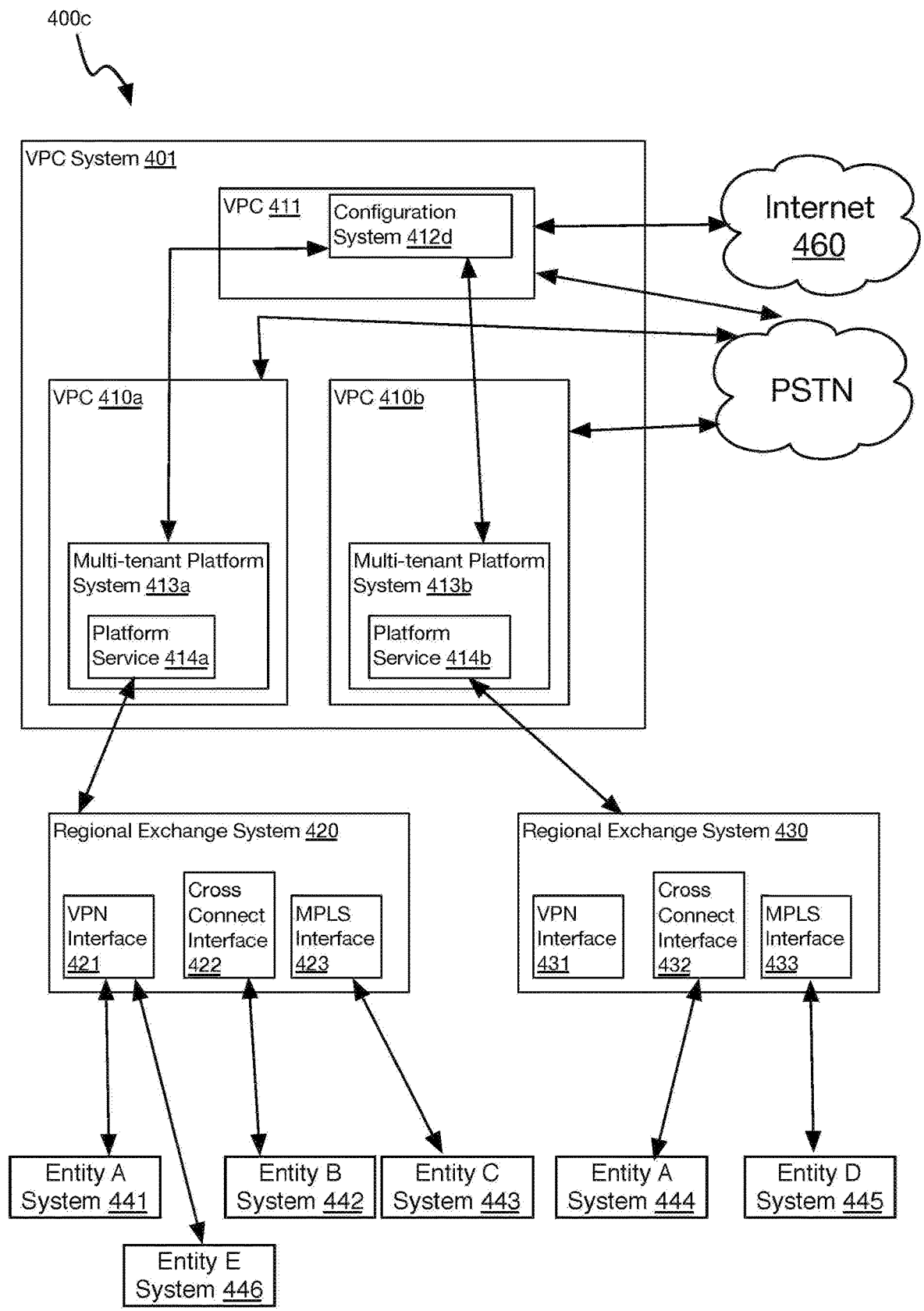
Figure 5A:
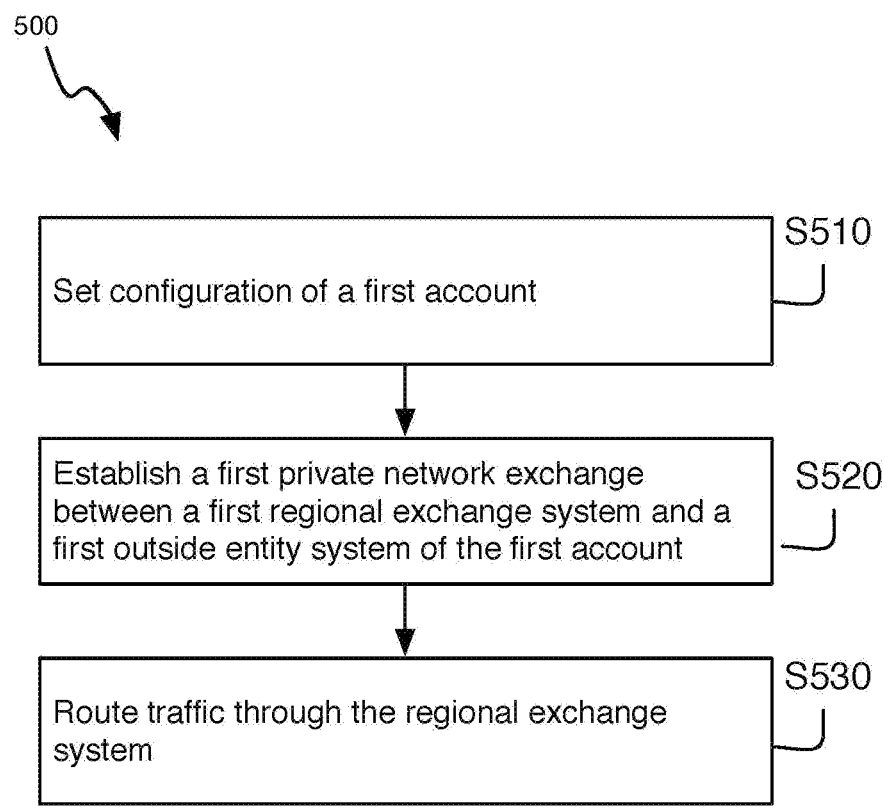
FIGS. 5A-5D are flow diagram representations of methods of preferred embodiments.
Figure 5B:
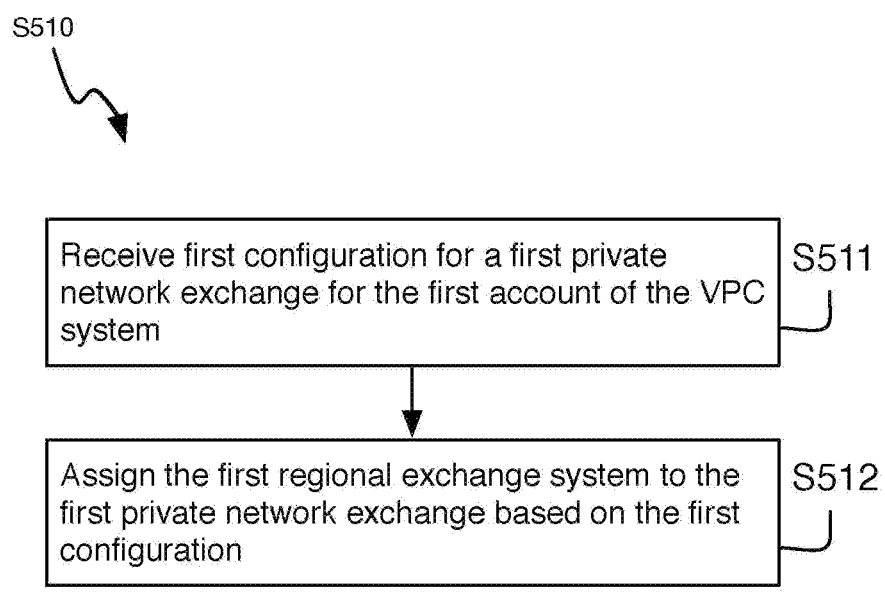
Figure 5C:
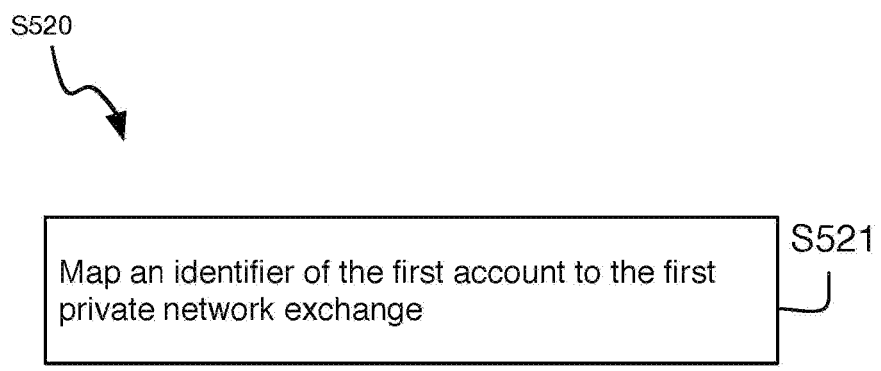
Figure 5D:
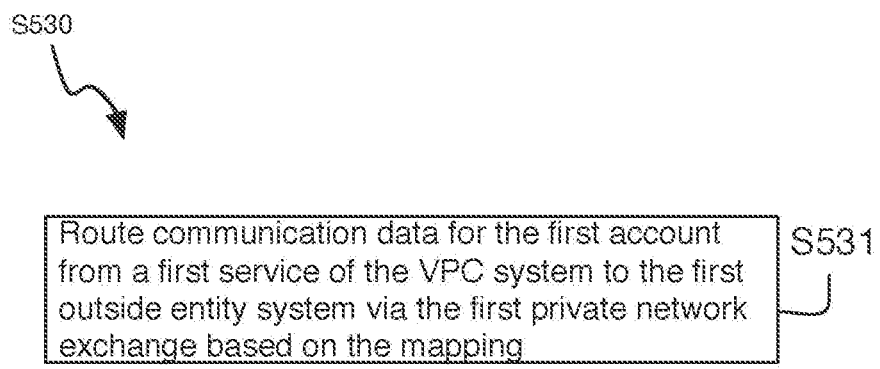

FIGS. 4A-C are schematic representations of systems 400a-c in accordance with embodiments. In some embodiments, the systems 400a-c include at least one virtual private cloud (VPC) system 401, and at least one regional exchange system (e.g., 420, 430).

In some embodiments, the VPC system 401 includes at least one virtual private cloud (e.g., VPC 410a-c).

In some embodiments, the VPC system 401 (FIG. 4A) includes a VPC (e.g., 410a, 410b) for each regional exchange system (e.g., 420, 430). In some embodiments, the VPC system 401 (FIG. 4A) includes a VPC (e.g., 410a, 410b) for each regional exchange system (e.g., 420, 430), each regional exchange system is communicatively coupled one VPC (e.g., 410a, 410b), and each regional exchange system is communicatively coupled to a different VPC. In some embodiments, each VPC (e.g., 410a, 410b) that is communicatively coupled to a regional exchange system is not communicatively coupled to the Internet 460. In some embodiments, the VPC system 401 (FIG. 4A) includes a VPC (e.g., 411) that is communicatively coupled to the Internet 460.

In some embodiments, the VPC system 401 (FIG. 4B) includes a VPC (e.g., 410c) for multiple regional exchange systems (e.g., 420, 430).

In some embodiments, the VPCs 410a and 410b of FIG. 4A, and the VPC 410c of FIG. 4B each include a multi-tenant platform system (e.g., 413a-c). In some embodiments, the VPCs 410a-c each include a configuration system (e.g., 412a-c). In some embodiments, the multi-tenant platform systems 413a-c include at least one platform service (e.g., 414a-c).

In some embodiments, the VPC 411 of FIG. 4A includes a multi-tenant platform system, as described herein. In some embodiments, the VPC 411 of FIG. 4A includes a configuration system, as described herein. In some embodiments, the VPC 411 is communicatively coupled to a PSTN network.

In some embodiments, as shown in system 400c of FIG. 4C, the VPCs 410a-b do not include a configuration system, the VPC 411 includes a configuration system 412d (similar to configuration systems 412a-c as described herein), the VPCs 410a and 410b are communicatively coupled to the configuration system 412d of the VPC 411, and the configuration system 412d of the VPC 411 is communicatively coupled to the Internet 460.

In some embodiments, the VPC 410a is communicatively coupled to the VPC 410b.

In some embodiments, the systems 400a and 400b are similar to the system 100 of FIG. 1. In some embodiments, the system 400c is similar to the system 100 of FIG. 1. In some embodiments, the regional exchange system 420 is similar to the regional exchange systems of FIG. 1. In some embodiments, the regional exchange system 430 is similar to the regional exchange systems of FIG. 1. In some embodiments, the configuration systems 412a-d are similar to the configuration system of FIG. 1. In some embodiments, the multi-tenant platform systems 413a-c are similar to the multi-tenant platform system of FIG. 1. In some embodiments, the VPCs 410a-c are similar to the VPC 110 of FIG. 1. In some embodiments, the VPC 411 is similar to the VPC 110 of FIG. 1. In some embodiments, the VPC system 401 is similar to a system of a IaaS cloud environment as described herein for FIG. 1. In some embodiments, the VPC system 401 is similar to a system of a third-party cloud solution provider as described herein for FIG. 1.

In some embodiments, the VPC system 401 is a VPC system of a IaaS (Infrastructure as a Service) provider.

In some embodiments, the VPC system 401 is an Amazon Web Services™ VPC system.

In some embodiments, the VPCs 410a-c are managed by a first entity that is an account holder of a first VPC account of the VPC system 401, the VPCs 410a-c are VPCs of the first VPC account, and the first entity is a PaaS (Platform as a Service) provider.

In some embodiments, the VPC 411 is managed by the first entity.

In some embodiments, each entity system that is communicatively coupled to a regional exchange system (e.g., 441-446) is associated with an account of the PaaS provider of the VPC that is communicatively coupled to the regional exchange system (e.g., 410a-c). In some embodiments, each entity system that is communicatively coupled to a regional exchange system (e.g., 441-446) uses at least a first service (e.g., 414a-c) of the respective multi-tenant platform system (e.g., 413a-c) provided by the PaaS provider of the VPC (e.g., 410a-c) that is communicatively coupled to the regional exchange system, and each entity system uses the first service (e.g., 414a-c) by communicating with the multi-tenant platform system (e.g., 413a-c) via a respective regional exchange system (e.g., 420, 430).

In some embodiments, the VPCs 410a-c are managed by a first entity that is an account holder of a first VPC account of the VPC system 401, the VPCs 410a-c are VPCs of the first VPC account, and the first entity is a SaaS (Software as a Service) provider. In some embodiments, each entity system that is communicatively coupled to a regional exchange system (e.g., 441-446) is associated with an account of the SaaS provider of the VPC that is communicatively coupled to the regional exchange system (e.g., 410a-c). In some embodiments, each entity system that is communicatively coupled to a regional exchange system (e.g., 441-446) uses at least a first service provided by the SaaS provider of the VPC that is communicatively coupled to the regional exchange system (e.g., 410a-c), and each entity system uses the first service by communicating with the VPC (that is communicatively coupled to the regional exchange system e.g., 410a-c) via a respective regional exchange system (e.g., 420, 430).

In some embodiments, the multi-tenant platform systems 413a-c are communicatively coupled to a respective configuration system 412a-c. In some embodiments, a multi-tenant platform system (e.g. of the VPC 411) is communicatively coupled to the Internet. In some embodiments, the multi-tenant platform systems 413a-c are communicatively coupled to at least one PSTN network (Public Switched Telephone Network).

In some embodiments, the multi-tenant platform systems are communicatively coupled to one regional exchange system (e.g., 420, 430). In some embodiments, the multi-tenant platform systems are communicatively coupled to one regional exchange system (e.g., 420, 430) via a private network connection. In some embodiments, the multi-tenant platform system 413a is communicatively coupled to regional exchange system 420 via a private network connection. In some embodiments, the multi-tenant platform system 413b is communicatively coupled regional exchange system 430 via a private network connection.

In some embodiments, the multi-tenant platform system 413c is communicatively coupled to regional exchange system 420 via a private network connection. In some embodiments, the multi-tenant platform system 413c is communicatively coupled regional exchange system 430 via a private network connection.

In some embodiments, the private network connection is a VLAN private network connection. In some embodiments, the private network connection is an 802.1Q VLAN private network connection. In some embodiments, the private network connection is an AWS (Amazon Web Services) Direct Connect private network connection.

In some embodiments, the regional exchange system 420 is communicatively coupled to at least one outside entity system (e.g., 441-446) via a private network exchange by using a secure connection interface (e.g., 421-423) of the regional exchange system 420. In some embodiments, the regional exchange system 420 is communicatively coupled to at least one customer outside entity system (e.g., 441-446) via a private network exchange. In some embodiments, the regional exchange system 420 is communicatively coupled to at least one service provider outside entity system (e.g., 441-446) via a private network exchange.

In some embodiments, the regional exchange system 430 is similar to the regional exchange system 420.

In some embodiments, the regional exchange system 430 is communicatively coupled to at least one outside entity system (e.g., 441-446) via a private network exchange by using a secure connection interface (e.g., 431-433) of the regional exchange system 430. In some embodiments, the regional exchange system 430 is communicatively coupled to at least one customer outside entity system (e.g., 441-446) via a private network exchange. In some embodiments, the regional exchange system 430 is communicatively coupled to at least one service provider outside entity system (e.g., 441-446) via a private network exchange.

In some embodiments, each regional exchange system (e.g., 420, 430) includes at least one secure connection interface (e.g., 421-423, 432-433). In some embodiments, each regional exchange system (e.g., 420, 430) includes a VPN secure connection interface (e.g., 421, 431), a cross connect secure connection interface (e.g., 422, 432), and an MPLS secure connection interface (e.g., 423, 433).

In some embodiments, each regional exchange system (e.g., 420, 430) is managed by a first entity that is an account holder of a first VPC account of the VPC system 401, the VPCs (e.g., 410a-c) are VPCs of the first VPC account, and the first entity is a PaaS (Platform as a Service) provider. In some embodiments, each regional exchange system (e.g., 420, 430) is managed by a first entity that is an account holder of a first VPC account of the VPC system 401, the VPCs (e.g., 410a-c) are VPCs of the first VPC account, and the first entity is a SaaS (Software as a Service) provider.

In some embodiments, each regional exchange system (e.g., 420, 430) is managed by an entity that is different from an entity that manages the VPC system 401. In some embodiments, each regional exchange system (e.g., 420, 430) is managed by a first entity that is an account holder of a VPC account of the VPC system 401, and the VPC system 401 is managed by a second entity that is different from the first entity. In some embodiments, the first entity is a PaaS (Platform as a Service) provider, and the second entity is a IaaS (Infrastructure as a Service) provider. In some embodiments, the first entity is a SaaS (Software as a Service) provider, and the second entity is a IaaS (Infrastructure as a Service) provider.

In some embodiments, each outside entity system (e.g., 441-446) is a router. In some embodiments, at least one outside entity system (e.g., 441-446) is a router. In some embodiments, each outside entity system (e.g., 441-446) is communicatively coupled to a PBX system of the respective entity. In some embodiments, at least one outside entity system (e.g., 441-446) is communicatively coupled to a PBX system of the respective entity. In some embodiments, each PBX system is communicatively coupled to at least one communication client device. In some embodiments, at least one PBX system is communicatively coupled to at least one communication client device.

In some embodiments, each hardware server of the multi-tenant platform systems 413a-c is managed by the VPC system 401. In some embodiments, each hardware server of the configuration systems 412a-d is managed by the VPC system 401. In some embodiments, the VPC system 401 is a hardware system. In some embodiments, the VPC system 401 of FIG. 4A includes at least one hardware server of the VPCs 410a-b and at least one hardware server of a VPC (not shown in FIG. 4A) of an entity different from an entity of the VPCs 410a-b. In some embodiments, the VPC system 401 of FIG. 4B includes at least one hardware server of the VPC 401c and at least one hardware server of a VPC (not shown in FIG. 4B) of an entity different from an entity of the VPC 410c.

In some embodiments, the platform services 414a-c are communication services. In some embodiments, the platform services 414a-c are real-time voice communication services. In some embodiments, the platform services 414a-c are messaging communication services. In some embodiments, the platform services 414a-c are SIP (Session Initiation Protocol) communication services that are constructed to communicate SIP data. In some embodiments, the platform services 414a-c are message communication services that are constructed to communicate asynchronous message data. In some embodiments, the platform services 414a-c are video communication services that are constructed to communicate video data. In some embodiments, the platform services 414a-c are IP Client communication services that are constructed to communicate IP Client communication data. In some embodiments, the platform services 414a-c are WebRTC (Web Real-Time Communication) communication services that are constructed to communicate WebRTC data.

In some embodiments, regional exchange system 420 is external to the VPC system 401 and the entity systems 441-446. In some embodiments, regional exchange system 430 is external to the VPC system 401 and the entity systems 441-446. In some embodiments, the entity systems 441-446 are external to the VPC system 401.

Methods

FIGS. 5A-D are flow diagram representations of methods in accordance with embodiments. In some embodiments, the method 500 is performed by the system 100 of FIG. 1. In some embodiments, the method 500 is performed by the system 400a of FIG. 4A. In some embodiments, the method 500 is performed by the system 400b of FIG. 4B. In some embodiments, the method 500 is performed by the system 400c of FIG. 4C.

In some embodiments, the method 500 includes: setting configuration of a first account (process S510), establishing a first private network exchange between a first regional exchange system (e.g., one of 420 and 430) and a first outside entity system (e.g., on of 441-446) of the first account (process S520); and routing traffic through the regional exchange system (process S530). In some embodiments, setting configuration of a first account (process S510) includes: a virtual private cloud (VPC) system (e.g., 401) receiving first configuration for a first private network exchange for the first account of the VPC system (process S511), and the VPC system assigning the first regional exchange system (e.g., one of 420 and 430) to the first private network exchange based on the first configuration (process S512). In some embodiments, establishing a first private network exchange between a first regional exchange system and a first outside entity system of the first account (process S520) includes mapping an identifier of the first account to the first private network exchange (process S521). In some embodiments, routing traffic through the regional exchange system (process S530) includes routing communication data for the first account from a first service (e.g., 414a-c) of the VPC system to the first outside entity system via the first private network exchange based on the mapping (process S531).

In some embodiments, the method 500 is similar to the method 300 of FIG. 3. In some embodiments, the process S510 is similar to the process S110 of FIG. 3. In some embodiments, the process S520 is similar to the process S120 of FIG. 3. In some embodiments, the process S530 is similar to the process S130 of FIG. 3.

In some embodiments, the first account is an account of a first multi-tenant platform system (e.g., 413a-c) of a first VPC (e.g., 410a-c) of the VPC system (e.g., 401), and the first service (e.g., 414a-c) is a service of the first multi-tenant platform system. In some embodiments, the first VPC is a VPC of a PaaS provider. In some embodiments, the first VPC is a VPC of a SaaS provider. In some embodiments, an entity of the first account uses a service (e.g., 414a-c) provided by the first multi-tenant platform system (e.g., 413a-c). In some embodiments, an entity of the first multi-tenant platform system (e.g., 413a-c) uses a service provided by the VPC system, and the VPC system and the multi-tenant platform system are managed by different entities.

In some embodiments, the VPC system receiving the first configuration (process S511) includes a configuration system (e.g., 412a-c) of a first VPC (e.g., 410a-c) of the VPC system receiving the first configuration. In some embodiments, the VPC system receiving the first configuration (process S511) includes a configuration system (e.g., 412d) that is communicatively coupled to a first VPC (e.g., 410a-c) of the VPC system receiving the first configuration. In some embodiments, the VPC system receiving the first configuration (process S511) includes a configuration system (e.g., 412a-c) of a first VPC of the VPC system receiving the first configuration and storing the first configuration in the first VPC in association with the first account. In some embodiments, the VPC system receiving the first configuration (process S511) includes a configuration system (e.g., 412d) communicatively coupled to a first VPC of the VPC system receiving the first configuration and storing the first configuration in association with the first account. In some embodiments, the VPC system receiving the first configuration (process S511) includes a multi-tenant platform system (e.g., 413a-c) of a first VPC of the VPC system receiving the first configuration. In some embodiments, a VPC system receiving the first configuration (process S511) includes a multi-tenant platform system (e.g., 413a-c) of a first VPC of the VPC system receiving the first configuration and storing the first configuration in the first VPC in association with the first account.

Private Network Exchange

In some embodiments, the first private network exchange is a layer 2 network exchange in accordance with a layer 2 network protocol.

Process S512: Assigning a Regional Exchange System

In some embodiments, the VPC system assigning the first regional exchange system to the first private network exchange (process S512) includes a configuration system (e.g., 412a-c) of a first VPC of the VPC system assigning the first regional exchange system to the first private network exchange.

In some embodiments, the VPC system assigning the first regional exchange system to the first private network exchange (process S512) includes a configuration system (e.g., 412d) communicatively coupled to a first VPC of the VPC system assigning the first regional exchange system to the first private network exchange.

In some embodiments, the VPC system assigning the first regional exchange system to the first private network exchange (process S512) includes a multi-tenant platform system (e.g., 413a-c) of a first VPC of the VPC system assigning the first regional exchange system to the first private network exchange. In some embodiments, the VPC system assigning the first regional exchange system to the first private network exchange (process S512) includes a routing manager of a first VPC (e.g., 410a-c) of the VPC system assigning the first regional exchange system to the first private network exchange.

In some embodiments, the VPC system assigning the first regional exchange system to the first private network exchange (process S512) includes: selecting the first regional exchange system from a plurality of regional exchange systems (e.g., 420, 430) based on the first configuration, and the plurality of regional exchange systems are external to the VPC system.

In some embodiments, the first configuration specifies selection of one of a plurality of private network exchange types (e.g., VPN, Cross Connet, MPLS), and the first regional exchange system is selected from a plurality of regional exchange systems (e.g., 420, 430) responsive to a determination that the first regional exchange system includes a secure connection interface (e.g., 421-423) for the private network exchange types specified by the first configuration. In some embodiments, the first private network exchange is a network exchange of the type specified by the first configuration.

In some embodiments, the first configuration specifies a bandwidth, and the first regional exchange system is selected from a plurality of regional exchange systems (e.g., 420, 430) responsive to a determination that the first regional exchange system can provide the bandwidth specified by the first configuration.

In some embodiments, the first configuration specifies a geographic location, and the first regional exchange system is selected from a plurality of regional exchange systems (e.g., 420, 430) responsive to a determination that the first regional exchange system is located in the geographic location specified by the first configuration.

Routing Communication Data

In some embodiments, a routing manager of a first VPC (e.g., 410a-c) of the VPC system routes the communication data based on the mapping. In some embodiments, the first service routes the communication data based on the mapping. In some embodiments, the first regional exchange system routes the communication data based on the mapping.

Services

In some embodiments, the first service (e.g., 414a-c) is a real-time voice communication service and the communication data is real-time voice communication data.

In some embodiments, the first service (e.g., 414a-c) is a real-time voice communication service, and the communication data includes voice call data received by the VPC system from a PSTN device via a PSTN network. In some embodiments, the first account is associated with a phone number of a PSTN network, and communication data for the first account is communication data for the associated phone number.

In some embodiments, the first service (e.g., 414a-c) is a SIP communication service and the communication data is SIP data. In some embodiments, the first account is associated with a SIP endpoint. In some embodiments, the first account is associated with a SIP endpoint, and communication data for the first account is communication data for the associated SIP endpoint.

In some embodiments, the first service (e.g., 414a-c) is a WebRTC communication service and the communication data is WebRTC data. In some embodiments, the first account is associated with a WebRTC endpoint. In some embodiments, the first account is associated with a WebRTC endpoint, and communication data for the first account is communication data for the associated WebRTC endpoint.

In some embodiments, the first service (e.g., 414a-c) is a messaging communication service and the communication data is messaging communication data.

In some embodiments, the first account is associated with a messaging endpoint.

In some embodiments, the VPC system 401 maps the identifier of the first account to the first private network exchange. In some embodiments, the configuration system (e.g., 412a-d) maps the identifier of the first account to the first private network exchange. In some embodiments, the platform system (e.g., 413a-c) maps the identifier of the first account to the first private network exchange. In some embodiments, a routing manager of the VPC (e.g., 410a-c) maps the identifier of the first account to the first private network exchange.

Mapping the Account Identifier to the Private Network Exchange

In some embodiments, the first regional exchange system (e.g., 420, 430) maps the identifier of the first account to the first private network exchange. In some embodiments, the first regional exchange system receives the identifier of the first account and maps the received identifier to the first private network exchange. In some embodiments, the first regional exchange system receives the identifier of the first account from the VPC system (e.g., 401). In some embodiments, the first regional exchange system receives the identifier of the first account from a first VPC (e.g., 410a-c) of the VPC system (e.g., 401). In some embodiments, a configuration system (e.g., 412a-c) of a first VPC (e.g., 410a-c) of the VPC system (e.g., 401) provides the first regional exchange system with the identifier of the first account. In some embodiments, a configuration system (e.g., 412d) communicatively coupled to a first VPC (e.g., 410a-c) of the VPC system (e.g., 401) provides the first regional exchange system with the identifier of the first account. In some embodiments, a routing manager of a first VPC (e.g., 410a-c) of the VPC system (e.g., 401) provides the first regional exchange system with the identifier of the first account. In some embodiments, a multi-tenant platform system (e.g., 413a-c) of a first VPC (e.g., 410a-c) of the VPC system (e.g., 401) provides the first regional exchange system with the identifier of the first account. In some embodiments, the first regional exchange system receives the identifier of the first account from an outside system of the first account.

In some embodiments, the first regional exchange system establishes the first private network exchange between the first regional exchange system and the first outside entity system. In some embodiments, the first regional exchange system advertises a network route for the established first private network exchange to the VPC that is communicatively coupled to the first regional exchange system.

In some embodiments, the identifier of the first account is an IP address assigned to the first account for the first private network exchange.

In some embodiments, assigning the first regional exchange system (process S512) includes assigning an IP address within a subnet of the first regional exchange system to the first private network exchange. In some embodiments, assigning the first regional exchange system (process S512) includes assigning an IP address within a subnet of the first regional exchange system to the first private network exchange, and the identifier of the first account is the IP address assigned to the first private network exchange, and the first private network exchange is associated with the first account.

In some embodiments, assigning the first regional exchange system (process S512) includes a routing manager of a first VPC (e.g., 410a-c) of the VPC system assigning an IP address within a subnet of the first regional exchange system to the first private network exchange, and the identifier of the first account is the IP address assigned to the first private network exchange, and the first private network exchange is associated with the first account.

In some embodiments, assigning the first regional exchange system (process S512) includes a configuration system (e.g., 413a-c) of a first VPC (e.g., 410a-c) of the VPC system assigning an IP address within a subnet of the first regional exchange system to the first private network exchange, and the identifier of the first account is the IP address assigned to the first private network exchange, and the first private network exchange is associated with the first account.

In some embodiments, the identifier for the first account is associated with the first account at the VPC system 401. In some embodiments, the identifier for the first account is associated with the first account at the configuration system (e.g., 412a-d). In some embodiments, the identifier for the first account is associated with the first account at platform system (e.g., 413a-c). In some embodiments, the identifier for the first account is associated with the first account at a routing manager of the VPC (e.g., 410a-c).

In some embodiments, the identifier for the first account is associated with the first private network exchange at the first regional exchange system (e.g., 420, 430). In some embodiments, the first account is an account of a customer entity, and the first outside entity system (e.g., one of 441-446) is a customer system.

In some embodiments, the first account is an account of a service provider, and the first outside entity system (e.g., one of 441-446) is a service provider system. In some embodiments, the service provider system provides PSTN communication data that includes voice call data received by the service provider system from a PSTN device via a PSTN network, and the service provider system provides PSTN communication data to the VPC system via the first private network exchange. In some embodiments, the service provider system provides SIP communication data that includes voice call data received by the service provider system from a SIP device, and the service provider system provides SIP communication data to the VPC system via the first private network exchange. In some embodiments, the service provider system provides WebRTC communication data that includes voice call data received by the service provider system from a WebRTC device, and the service provider system provides WebRTC communication data to the VPC system via the first private network exchange.

In some embodiments, the service provider system provides asynchronous message communication data that includes message data received by the service provider system from a messaging client device, and the service provider system provides message communication data to the VPC system via the first private network exchange.

Sub-Accounts

In some embodiments, the first account is a first sub-account of a first entity, a second private network exchange is configured for a second sub-account of the first entity, and the second private network exchange is a network exchange for communication between the VPC system and a second outside entity system of the first entity.

Multi-Tenancy

In some embodiments, the first account is an account of a first VPC (e.g., 410a-c) of the VPC system (e.g., 401). A second private network exchange is configured for a second account of the first VPC (e.g., 410a-c), and the second account is associated with a second outside entity that uses a service of the first VPC. The second private network exchange is a network exchange for communication between the VPC system (e.g., 401) and a second outside entity system of the second entity.

Configuration

In some embodiments, the VPC system receives the first configuration via a public Internet connection.

In some embodiments, the first configuration is received from a system of an account holder of the first account via one of a programmatic interface and a graphical user interface, and the first configuration is stored in association with the first account at the VPC system. In some embodiments, the first configuration is received by a configuration system (e.g., 412a-c), of a first VPC of the VPC system, from a system of an account holder of the first account via one of a programmatic interface and a graphical user interface, and the first configuration is stored in association with the first account at the first VPC. In some embodiments, the first configuration is received by a configuration system (e.g., 412d), communicatively coupled to a first VPC of the VPC system, from a system of an account holder of the first account via one of a programmatic interface and a graphical user interface, and the first configuration is stored in association with the first account.

In some embodiments, a configuration system (e.g., 412a-c), of a first VPC of the VPC system, receives the first configuration from a system of an account holder of the first account via a public Internet interface, and the configuration system receives second configuration for a second account from a system of an account holder of the second account via the public Internet interface.

In some embodiments, a configuration system (e.g., 412d), communicatively coupled to a first VPC of the VPC system, receives the first configuration from a system of an account holder of the first account via a public Internet interface, and the configuration system receives second configuration for a second account from a system of an account holder of the second account via the public Internet interface.

Communication Between the VPC System and Regional Exchange Systems

In some embodiments, the VPC system and the first regional exchange system (e.g., 420) communicate via a private network connection. In some embodiments, the private network connection is a VLAN private network connection. In some embodiments, the private network connection is an 802.1Q VLAN private network connection. In some embodiments, the private network connection is an AWS (Amazon Web Services) Direct Connect private network connection.

Process S531: Routing Communication Data to the Outside Entity System

In some embodiments, routing communication data for the first account from a first service of the VPC system to the first outside entity system via the first private network exchange based on the mapping (process S531) includes: the VPC system providing the communication data to the first regional exchange system via the private network connection between the VPC system and the first regional exchange system, the first regional exchange system determining that the first private network connection is to be used for the communication data, and providing the received communication data to the first outside entity system via the determined first private network exchange. In some embodiments, the first regional exchange system determines that the first private network connection is to be used for the communication data based on the mapping performed at the process S521.

In some embodiments, the first regional exchange system determines that the first private network connection is to be used for the communication data based a destination IP address of the communication data. In some embodiments, the first regional exchange system determines that the first private network connection is to be used for the communication responsive to a determination that a destination IP address of the communication data is mapped to the first private network exchange.

In some embodiments, the first regional exchange system determines that the first private network connection is to be used for the communication data based a source IP address of the communication data. In some embodiments, the first regional exchange system determines that the first private network connection is to be used for the communication responsive to a determination that a source IP address of the communication data is mapped to the first private network exchange.

In some embodiments, the first regional exchange system determines that the first private network connection is to be used for the communication data based a destination communication endpoint identifier specified by the communication data.

In some embodiments, the first regional exchange system determines that the first private network connection is to be used for the communication responsive to a determination that a destination communication endpoint identifier of the communication data is mapped to the first private network exchange.

In some embodiments, the first regional exchange system determines that the first private network connection is to be used for the communication data based a source communication endpoint identifier specified by the communication data.

In some embodiments, the first regional exchange system determines that the first private network connection is to be used for the communication responsive to a determination that a source communication endpoint identifier of the communication data is mapped to the first private network exchange.

In some embodiments, the first regional exchange system uses an edge computing resource of the first regional exchange system to identify a destination communication endpoint identifier specified by the communication data, and the first regional exchange system determines that the first private network connection is to be used for the communication data based the identified destination communication endpoint identifier.

In some embodiments, the first regional exchange system uses an edge computing resource of the first regional exchange system to identify a source communication endpoint identifier specified by the communication data, and the first regional exchange system determines that the first private network connection is to be used for the communication data based the identified source communication endpoint identifier.

In some embodiments, the communication data is SIP data, the edge computing resource includes a SIP edge server, and the destination communication endpoint identifier is specified by a SIP "To" header of the SIP data.

In some embodiments, the communication data is SIP data, the edge computing resource includes a SIP edge server, and the source communication endpoint identifier is specified by a SIP "From" header of the SIP data.

In some embodiments, the communication data is WebRTC data, and the edge computing resource includes a WebRTC edge server.

In some embodiments, the communication data is WebRTC data, the edge computing resource includes a WebRTC edge server, and the source communication endpoint identifier is specified by a SIP "From" header of the WebRTC data.

In some embodiments, the communication data is WebRTC data, the edge computing resource includes a WebRTC edge server, and the destination communication endpoint identifier is specified by a SIP "To" header of the WebRTC data.

In some embodiments, the communication data is IP Client communication data, and the edge computing resource includes a IP Client communication server.

In some embodiments, the communication data is video data, and the edge computing resource includes a video streaming server.

In some embodiments, the communication data is asynchronous message data, and the edge computing resource includes a messaging server.

Authorization for Communication Via Private Network Exchange

In some embodiments, routing communication data for the first account from a first service (e.g., 414*a-c*) of the VPC system to the first outside entity system via the first private network exchange based on the mapping (process S531) includes: the VPC system providing the communication data of the first service to the first regional exchange system responsive to a determination that communication to a destination endpoint identified by the communication data is authorized to receive the communication data via the first private network exchange.

In some embodiments, a configuration system (e.g., 412*a-c*) of a first VPC of the VPC system provides the communication data of the first service to the first regional exchange system responsive to a determination that communication to a destination endpoint identified by the communication data is authorized to receive the communication data via the first private network exchange.

In some embodiments, a configuration system (e.g., 412d) communicatively coupled to a first VPC of the VPC system provides the communication data of the first service to the first regional exchange system responsive to a determination that communication to a destination endpoint identified by the communication data is authorized to receive the communication data via the first private network exchange.

In some embodiments, a multi-tenant platform system (e.g., 413a-c) of a first VPC of the VPC system provides the communication data of the first service to the first regional exchange system responsive to a determination that communication to a destination endpoint identified by the communication data is authorized to receive the communication data via the first private network exchange.

In some embodiments, routing communication data for the first account from a first service (e.g., 414a-c) of the VPC system to the first outside entity system via the first private network exchange based on the mapping (process S531) includes: the VPC system providing the communication data of the first service to the first regional exchange system responsive to a determination that a source endpoint identified by the communication data is authorized to provide the communication data via the first private network exchange.

In some embodiments, a configuration system (e.g., 412a-c) of a first VPC of the VPC system provides the communication data of the first service to the first regional exchange system responsive to a determination that a source endpoint identified by the communication data is authorized to provide the communication data via the first private network exchange.

In some embodiments, a configuration system (e.g., 412d) communicatively coupled to a first VPC of the VPC system provides the communication data of the first service to the first regional exchange system responsive to a determination that a source endpoint identified by the communication data is authorized to provide the communication data via the first private network exchange.

In some embodiments, a multi-tenant platform system (e.g., 413a-c) of a first VPC of the VPC system provides the communication data of the first service to the first regional exchange system responsive to a determination that a source endpoint identified by the communication data is authorized to provide the communication data via the first private network exchange.

In some embodiments, the VPC system identifies the destination endpoint by using the first service. In some embodiments, the VPC system identifies the source endpoint by using the first service.

In some embodiments, a configuration system (e.g., 412a-c) of a first VPC of the VPC system identifies the destination endpoint by using the first service.

In some embodiments, a configuration system (e.g., 412a-c) of a first VPC of the VPC system identifies the source endpoint by using the first service.

In some embodiments, a configuration system (e.g., 412d) communicatively coupled to a first VPC of the VPC system identifies the destination endpoint by using the first service.

In some embodiments, a configuration system (e.g., 412d) communicatively coupled to a first VPC of the VPC system identifies the source endpoint by using the first service.

In some embodiments, a multi-tenant platform system (e.g., 413a-c) of a first VPC of the VPC system identifies the destination endpoint by using the first service.

In some embodiments, a multi-tenant platform system (e.g., 413a-c) of a first VPC of the VPC system identifies the source endpoint by using the first service.

In some embodiments, the communication data is SIP data, the first service a SIP service, and the destination communication endpoint identifier is specified by a SIP "To" header of the SIP data.

In some embodiments, the communication data is SIP data, the first service a SIP service, and the source communication endpoint identifier is specified by a SIP "From" header of the SIP data.

In some embodiments, the communication data is WebRTC data, the first service a WebRTC service, and the destination communication endpoint identifier is specified by a SIP "To" header of the WebRTC data.

In some embodiments, the communication data is WebRTC data, the first service a WebRTC service, and the source communication endpoint identifier is specified by a SIP "From" header of the WebRTC data.

Information Identifying an Account

In some embodiments, communication data routed from the first outside entity system to the first service via the regional exchange system includes information identifying the first account. In some embodiments, the information identifying the first account is an IP address. In some embodiments, the information identifying the first account is a communication endpoint identifier.

Routing Communication Data from an Entity System to the VPC System

In some embodiments, routing traffic through the regional exchange system (process S530) includes: routing communication data for the first account from the first outside entity system to the first service of the VPC system via the first private network exchange by performing IP translation between a public IP address of the first service used by the first outside entity system and a private IP address of the first service used within the VPC system.

In some embodiments, a first VPC (e.g., 410a-c) of the VPC system assigns a first private IP address of the first VPC to the first service, the first regional exchange system maps a first public IP address of the first regional exchange system to the first private IP address of the first service, assigns the first public IP address to the first account, and communication data for the first account received by the first regional exchange system from the first outside entity system specifies the first public IP address as a destination IP address. In some embodiments, the first regional exchange system performs IP address translation by replacing the first public IP address of the communication data received from the first outside entity system with the first private IP address, and providing the communication data with the first private IP address to the first service at the VPC system.

In some embodiments, communication data for the first account received by the first regional exchange system from the first service specifies the first private IP address as a source IP address, and the first regional exchange system performs IP address translation by replacing the first private IP address of the communication data received from the first service with the first public IP address, and providing the communication data with the first public IP address to the first outside entity system.

In some embodiments, the first VPC (e.g., 410a-c) of the VPC system updates the first service by assigning a second private IP address of the first VPC to the first service, the first VPC provides the second private IP address of the updated first service to the first regional exchange system, and the first regional exchange system updates the mapping for the first public IP address of the first service with the second private IP address. In some embodiments, the first regional exchange system updates the mapping for the first public IP address by replacing the mapping of the first private IP address to the first public IP address with a mapping of the second private IP address to the first public IP address.

In some embodiments, a routing manager of the first VPC updates the first service and provides the second private IP address to the first regional exchange system. In some embodiments, a configuration system (e.g., 412*a-c*) of the first VPC updates the first service and provides the second private IP address to the first regional exchange system. In some embodiments, a configuration system (e.g., 412*d*) communicatively coupled to the first VPC updates the first service and provides the second private IP address to the first regional exchange system. In some embodiments, a multi-tenant platform system (e.g., 413*a-c*) of the first VPC updates the first service and provides the second private IP address to the first regional exchange system.

In some embodiments, a multi-tenant platform system (e.g., 413*a-c*) of the first VPC updates the first service and provides the second private IP address to the first regional exchange system. In some embodiments, an orchestration system of the first VPC updates the first service and provides the second private IP address to the first regional exchange system.

Voice Communication

In some embodiments, a first communication domain is associated with the first account and the first communication domain includes a set of communication endpoint identifiers.

In some embodiments, a multi-tenant platform system (e.g. 413*a-c*) of a first VPC of the VPC system maps a communication domain (that includes a set of communication endpoints) of the first account to the first private network exchange.

In some embodiments, assigning the first regional exchange system (process S512) includes assigning a first IP address within a subnet of the first regional exchange system to the first private network exchange, and a multi-tenant platform system (e.g. 413*a-c*) of a first VPC of the VPC system maps a communication domain of the first account to the first IP address assigned to the first private network exchange. In some embodiments, communication data received at the multi-tenant platform system that specifies a destination communication endpoint identifier that is included in the communication domain of the first account is provided to the first outside entity system via the first private network exchange.

SIP Communication

In some embodiments, the communication data is SIP data, the first service a SIP service, and a multi-tenant platform system (e.g., 413*a-c*) of a first VPC of the VPC system maps a SIP domain of the first account to the first private network exchange.

In some embodiments, assigning the first regional exchange system (process S512) includes assigning a first IP address within a subnet of the first regional exchange system to the first private network exchange, the communication data is SIP data, the first service a SIP service, and a multi-tenant platform system (e.g., 413*a-c*) of a first VPC of the VPC system maps a SIP domain of the first account to the first IP address assigned to the first private network exchange. In some embodiments, SIP communication data received at the multi-tenant platform system that specifies a destination SIP endpoint identifier that is included in the SIP domain of the first account is provided to the first outside entity system via the first private network exchange.

WebRTC Communication

In some embodiments, the communication data is WebRTC data, the first service a WebRTC service, and a multi-tenant platform system (e.g. 413*a-c*) of a first VPC of the VPC system maps a SIP domain (for WebRTC communication) of the first account to the first private network exchange.

In some embodiments, assigning the first regional exchange system (process S512) includes assigning a first IP address within a subnet of the first regional exchange system to the first private network exchange, the communication data is WebRTC data, the first service a WebRTC service, and a multi-tenant platform system (e.g. 413) of a first VPC of the VPC system maps a SIP domain (for WebRTC communication) of the first account to the first IP address assigned to the first private network exchange. In some embodiments, WebRTC communication data received at the multi-tenant platform system that specifies a destination SIP endpoint identifier that is included in the SIP domain of the first account is provided to the first outside entity system via the first private network exchange.

Messaging Communication

In some embodiments, the communication data is asynchronous message data, the first service a messaging service, and a multi-tenant platform system (e.g. 413*a-c*) of a first VPC of the VPC system maps a messaging domain (that includes messaging communication endpoint identifiers) of the first account to the first private network exchange.

In some embodiments, assigning the first regional exchange system (process S512) includes assigning a first IP address within a subnet of the first regional exchange system to the first private network exchange, the communication data is asynchronous message data, the first service a messaging service, and a multi-tenant platform system (e.g., 413*a-c*) of a first VPC of the VPC system maps a messaging domain of the first account to the first IP address assigned to the first private network exchange. In some embodiments, asynchronous message communication data received at the multi-tenant platform system that specifies a destination messaging endpoint identifier that is included in the messaging domain of the first account is provided to the first outside entity system via the first private network exchange.

System Architecture: VPC System

Figure 6:
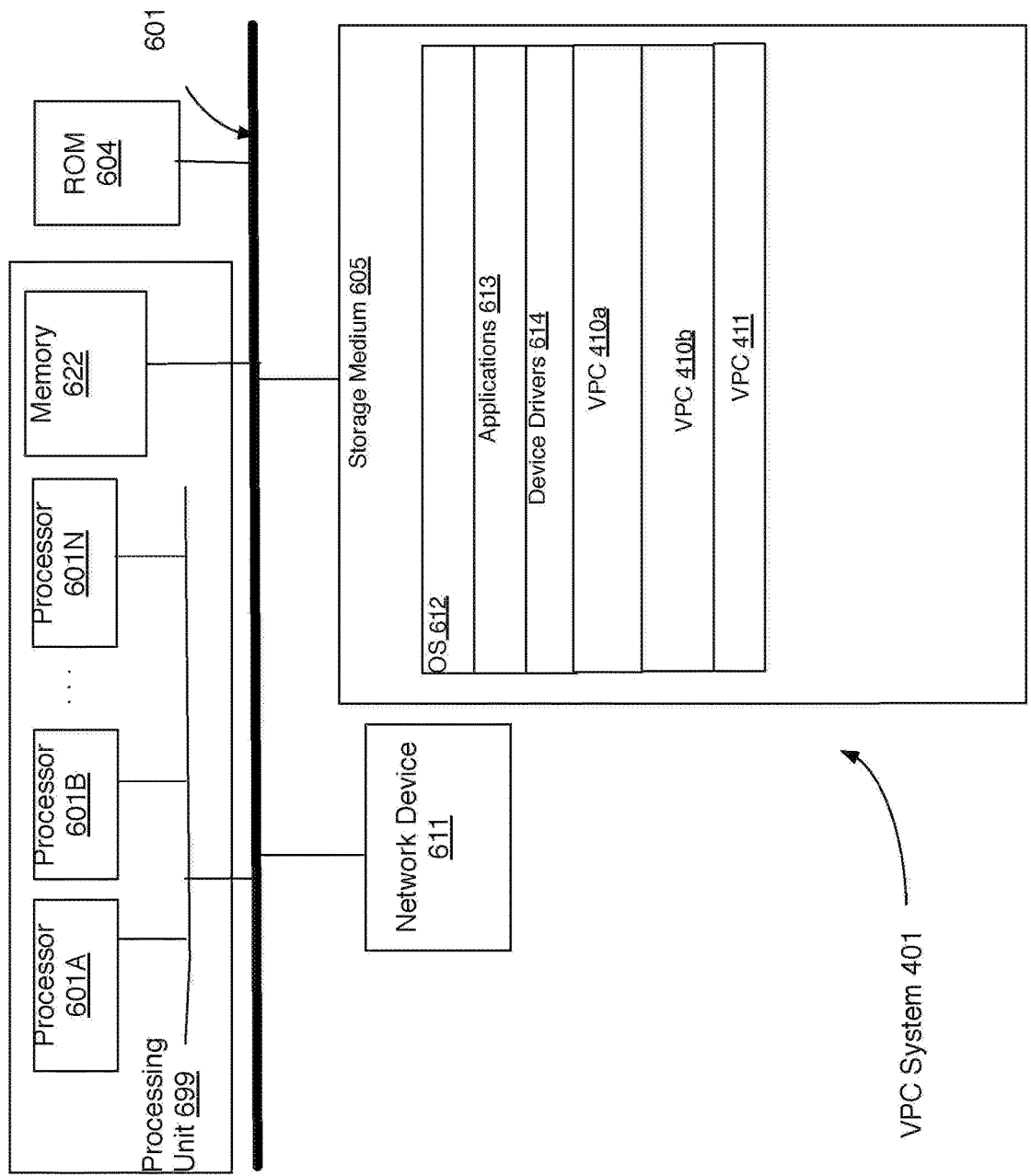
FIG. 6 is an architecture diagram of a Virtual Private Cloud system of a preferred embodiment.

FIG. 6 is a diagram depicting system architecture of a VPC system, according to embodiments. FIG. 6 is an architecture diagram of a VPC system (e.g., VPC system 401 of FIG. 4) according to an embodiment in which the VPC system is implemented by a server device. In some embodiments, the VPC system is implemented by a plurality of devices.

In some embodiments, the VPC system is implemented by a server device that includes machine-executable instructions (and related data) for the VPCs 410*a-b* and 411.

In some embodiments, the VPC system is implemented by a plurality of devices, and the plurality of devices include machine-executable instructions (and related data) for the VPCs 410*a-b* and 411.

In some embodiments, the VPC system is implemented by at least one server device that includes machine-executable instructions (and related data) for a plurality of VPCs including the VPCs 410*a-b* and 411, and at least two of the plurality of VPCs are VPCs of different entities having different VPC accounts at the VPC system.

In some embodiments, the VPC system is an Amazon Web Services™ VPC system.

In some embodiments, the bus 601 interfaces with the processors 601A-601N, the main memory (e.g., a random access memory (RAM)) 622, a read only memory (ROM) 604, a processor-readable storage medium 605, and a network device 611. In some embodiments, the platform system includes at least one of a display device and a user input device.

In some embodiments, the processors 601A-601N may take many forms, such as ARM processors, X86 processors, and the like.

In some embodiments, the VPC system includes at least one of a central processing unit (processor) and a multi-processor unit (MPU).

In some embodiments, the processors 601A-601N and the main memory 622 form a processing unit 699. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more VPCs (e.g., 410a-b, 411).

In some embodiments, the network device 611 provides one or more wired or wireless interfaces for exchanging data and commands between the VPC system and other devices, such as a regional exchange system (e.g., 420, 430), a device communicatively coupled to the VPC system via the Internet, and a device communicatively coupled to the VPC system via a PSTN network. Such wired and wireless interfaces include, for example, a universal serial bus (USB) interface, Bluetooth interface, an optical interface, Wi-Fi interface, Ethernet interface, near field communication (NFC) interface, and the like.

Machine-executable instructions in software programs (such as an operating system, application programs, and device drivers) are loaded into the memory 622 (of the processing unit 699) from the processor-readable storage medium 605, the ROM 604 or any other storage location. During execution of these software programs, the respective machine-executable instructions are accessed by at least one of processors 601A-601N (of the processing unit 699) via the bus 601, and then executed by at least one of processors 601A-601N. Data used by the software programs are also stored in the memory 622, and such data is accessed by at least one of processors 601A-601N during execution of the machine-executable instructions of the software programs. The processor-readable storage medium 605 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. In some embodiments, the processor-readable storage medium 605 includes machine-executable instructions (and related data) for an operating system 612, software programs 613, device drivers 614, the VPCs 410a-b and 411.

System Architecture: Regional Exchange System

Figure 7:
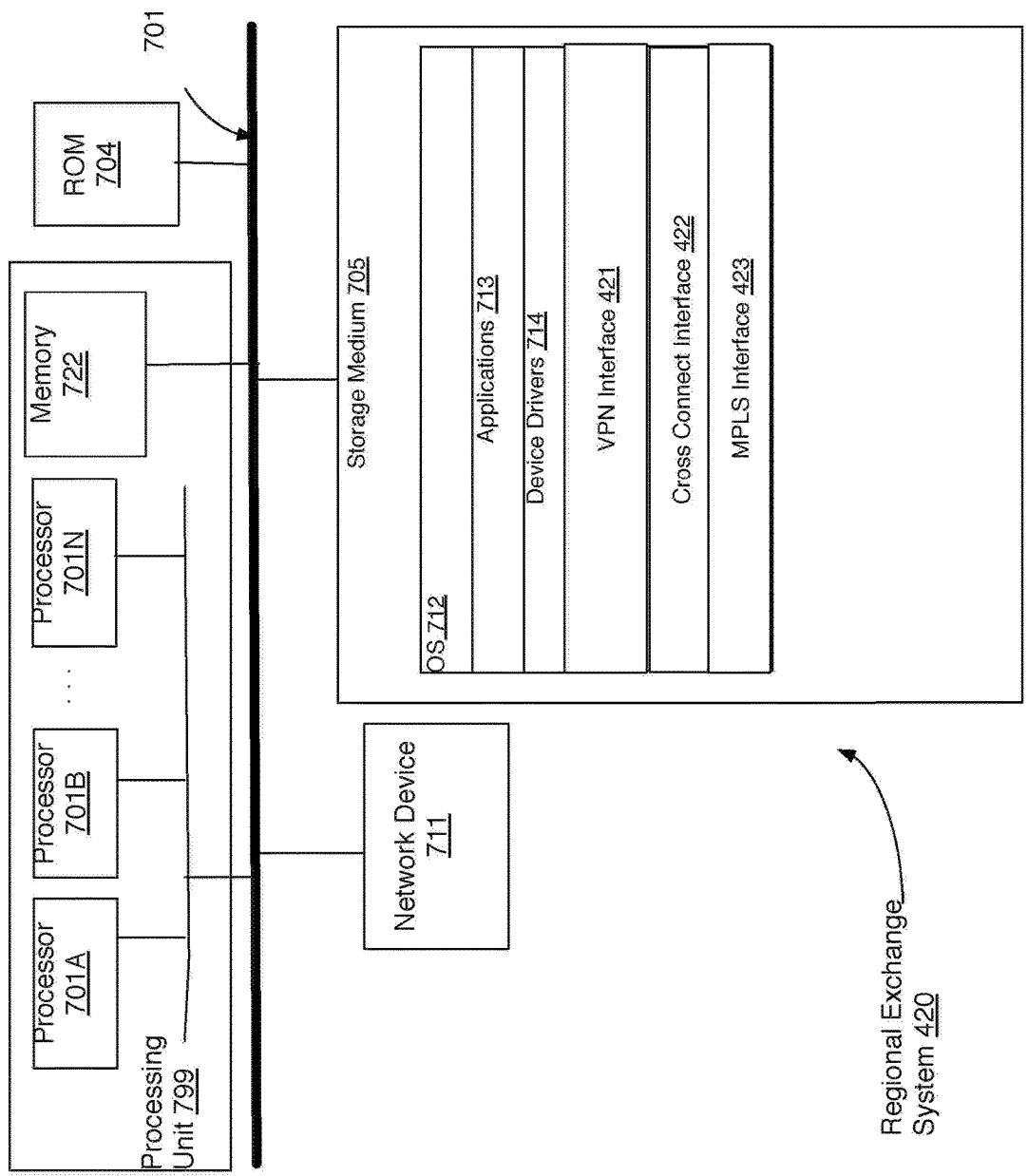
FIG. 7 is an architecture diagram of a regional exchange system of a preferred embodiment.

FIG. 7 is a diagram depicting system architecture of a regional exchange system, according to embodiments. FIG. 7 is an architecture diagram of a regional exchange system (e.g., regional exchange system 420 of FIGS. 4A-C) according to an embodiment in which the regional exchange system is implemented by a server device. In some embodiments, the regional exchange system is implemented by a plurality of devices.

In some embodiments, the regional exchange system is implemented by a server device that includes machine-executable instructions (and related data) for the VPN interface 421, the cross connect interface 422, and the MPLS interface 423.

In some embodiments, the regional exchange system is implemented by a plurality of devices, and the plurality of devices include machine-executable instructions (and related data) for the VPN interface 421, the cross connect interface 422, and the MPLS interface 423.

The bus 701 interfaces with the processors 701A-701N, the main memory (e.g., a random access memory (RAM)) 722, a read only memory (ROM) 704, a processor-readable storage medium 705, and a network device 711. In some embodiments, the regional exchange system includes at least one of a display device and a user input device.

The processors 701A-701N may take many forms, such as ARM processors, X86 processors, and the like.

In some embodiments, the regional exchange system includes at least one of a central processing unit (processor) and a multi-processor unit (MPU).

The processors 701A-701N and the main memory 722 form a processing unit 799. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of a VPN interface (e.g., 421), a cross connect interface (e.g., 422), and a MPLS interface (e.g., 423).

The network device 711 provides one or more wired or wireless interfaces for exchanging data and commands between the regional exchange system and other devices, such as a VPC system (e.g., 401 of FIG. 4) and an entity system (e.g., 441-446 of FIG. 4). Such wired and wireless interfaces include, for example, a universal serial bus (USB) interface, Bluetooth interface, an optical interface, Wi-Fi interface, Ethernet interface, near field communication (NFC) interface, and the like.

Machine-executable instructions in software programs (such as an operating system, application programs, and device drivers) are loaded into the memory 722 (of the processing unit 799) from the processor-readable storage medium 705, the ROM 704 or any other storage location. During execution of these software programs, the respective machine-executable instructions are accessed by at least one of processors 701A-701N (of the processing unit 799) via the bus 701, and then executed by at least one of processors 701A-701N. Data used by the software programs are also stored in the memory 722, and such data is accessed by at least one of processors 701A-701N during execution of the machine-executable instructions of the software programs. The processor-readable storage medium 705 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. In some embodiments, the processor-readable storage medium 705 includes machine-executable instructions (and related data) for an operating system 712, software programs 713, device drivers 714, the VPC interface 421, the cross connect interface 422, and the MPLS interface 423.

Machines

The systems and methods of the preferred embodiments and variations thereof can be embodied and/or implemented at least in part as a machine configured to receive a computer-readable medium storing computer-readable instructions. The instructions are preferably executed by computer-executable components. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

CONCLUSION

As a person skilled in the art will recognize from the previous detailed description and from the figures and claims, modifications and changes can be made to the preferred embodiments without departing from the scope of this invention defined in the following claims.

What is claimed is:

1. A method comprising:
providing, by a service provider, a multitenant platform inside a cloud computing service delivered by a cloud solution provider that is different from the service provider, the cloud computing service delivering computing services to a plurality of users, the multitenant platform providing network exchange functionality to the plurality of users;
establishing, by the service provider, a network connection from the multitenant platform to a regional exchange system of the service provider at a first location, the regional exchange system providing a plurality of private network exchange interfaces for connecting users to the multitenant platform through the regional exchange system, each network exchange interface providing a different type of network connection with a different communications protocol, wherein the plurality of private network exchange interfaces at the regional exchange system includes a virtual private network (VPN) connection, a cross connect connection, and a multiprotocol label switching (MPLS) connection;
configuring, by the service provider, the regional exchange system to provide secure network communications, for a first user from the plurality of users, to communicate with the cloud computing service through one of the plurality of private network exchange interfaces of the regional exchange system; and
delivering, via the service provider, the secure network communications for the first user using the configured regional exchange system.

2. The method as recited in claim 1, wherein the multitenant platform and the regional exchange system are managed by the service provider and the cloud computing service is managed by the cloud solution provider.

3. The method as recited in claim 1, further comprising:
providing a user interface for adding and configuring one from the plurality of private network exchanges at the regional exchange system for connecting devices of the first user to the regional exchange system.

4. The method as recited in claim 1, wherein the regional exchange system provides physical collocated networking infrastructure for the plurality of private network exchange interfaces to facilitate the secure network communications.

5. The method as recited in claim 1, wherein delivering the secure network communications includes:
routing real-time voice communication data for the first user through the regional exchange system and through a real-time voice communication service of the multitenant platform inside the cloud computing service.

6. The method as recited in claim 1, wherein the multitenant platform is a communication platform that provides voice communication connectivity, messaging, conferencing, broadcasting, and data streaming.

7. The method as recited in claim 1, wherein the cloud computing service is a virtual private cloud (VPC) with resources provisioned from a third-party cloud solution provider.

8. The method as recited in claim 1, wherein delivering the secure network communications for the first user comprises:
providing real-time voice communication data to the regional exchange system responsive to a determination that a destination endpoint is authorized to receive the real-time voice communication data via the regional exchange system; and
providing the real-time voice communication data to the regional exchange system responsive to a determination that a source endpoint identified by the real-time voice communication data is authorized to provide the real-time voice communication data via the regional exchange system.

9. The method as recited in claim 1, wherein configuring one or more regional exchange systems includes determining an internet protocol (IP) address for the secure network communications.

10. A system comprising:
a multitenant platform of a service provider, the multitenant platform executing on a first computer processor and situated at a cloud computing service of a cloud solution provider that delivers computing services to a plurality of users, the cloud solution provider being different from the service provider, the multitenant platform providing network exchange functionality to the plurality of users; and
a regional exchange system, of the service provider at a first location and executing on a second computer processor, configured for establishing a network connection to the multitenant platform, the regional exchange system providing a plurality of private network exchange interfaces for connecting users to the multitenant platform through the regional exchange system, each network exchange interface providing a different type of network connection with a different communications protocol, wherein the plurality of private network exchange interfaces at the regional exchange system includes a virtual private network (VPN) connection, a cross connect connection, and a multiprotocol label switching (MPLS) connection, wherein the regional exchange system is configurable to provide secure network communications, for a first user from the plurality of users, to communicate with the cloud computing service through one of the plurality of private network exchange interfaces of the regional exchange system, wherein the regional exchange system and the multitenant platform deliver the secure network communications for the first user utilizing the cloud computing service.

11. The system as recited in claim 10, wherein the multitenant platform and the regional exchange system are managed by the service provider and the cloud computing service is managed by the cloud solution provider.

12. The system as recited in claim 10, wherein the multitenant platform provides a user interface for adding and configuring one from the plurality of private network exchanges at the regional exchange system for connecting devices of the first user to the regional exchange system.

13. The system as recited in claim 10, wherein the regional exchange system provides physical collocated networking infrastructure for the plurality of private network exchange interfaces to facilitate the secure network communications.

14. The system as recited in claim 10, wherein delivering the secure network communications includes routing real-time voice communication data for the first user through the regional exchange system and through a real-time voice communication service of the multitenant platform.

15. A non-transitory machine-readable storage medium including instructions that, when executed by a machine, cause the machine to perform operations comprising:
   providing, by a service provider, a multitenant platform inside a cloud computing service delivered by a cloud solution provider that is different from the service provider, the cloud computing service delivering computing services to a plurality of users, the multitenant platform providing network exchange functionality to the plurality of users;
   establishing, by the service provider, a network connection from the multitenant platform to a regional exchange system of the service provider at a first location, the regional exchange system providing a plurality of private network exchange interfaces for connecting users to the multitenant platform through the regional exchange system, each network exchange interface providing a different type of network connection with a different communications protocol, wherein the plurality of private network exchange interfaces at the regional exchange system includes a virtual private network (VPN) connection, a cross connect connection, and a multiprotocol label switching (MPLS) connection;
   configuring, by the service provider, the regional exchange system to provide secure network communications, for a first user from the plurality of users, to communicate with the cloud computing service through one of the plurality of private network exchange interfaces of the regional exchange system; and
   delivering, via the service provider, the secure network communications for the first user using the configured regional exchange system.

16. The non-transitory machine-readable storage medium as recited in claim 15, wherein the multitenant platform and the regional exchange system are managed by the service provider and the cloud computing service is managed by the cloud solution provider.

17. The non-transitory machine-readable storage medium as recited in claim 15, wherein the machine further performs operations comprising:
   providing a user interface for adding and configuring one from the plurality of private network exchanges at the regional exchange system for connecting devices of the first user to the regional exchange system.

18. The non-transitory machine-readable storage medium as recited in claim 15, wherein the regional exchange system provides physical collocated networking infrastructure for the plurality of private network exchange interfaces to facilitate the secure network communications.

19. The non-transitory machine-readable storage medium as recited in claim 15, wherein delivering the secure network communications includes:
   routing real-time voice communication data for the first user through the regional exchange system and through a real-time voice communication service of the multitenant platform inside the cloud computing service.

\* \* \* \* \*